(12) United States Patent
Puhov et al.

(10) Patent No.: US 11,681,441 B2
(45) Date of Patent: Jun. 20, 2023

(54) INPUT/OUTPUT PROCESSING IN A DISTRIBUTED STORAGE NODE WITH RDMA

(71) Applicant: Huawei Technologies Co., Ltd., Shenzhen (CN)

(72) Inventors: Peter Puhov, Shrewsbury, MA (US); Robert Foley, Clinton, MA (US)

(73) Assignee: Huawei Technologies Co., Ltd., Shenzhen (CN)

(*) Notice: Subject to any disclaimer, the term of this patent is extended or adjusted under 35 U.S.C. 154(b) by 146 days.

(21) Appl. No.: 17/305,752

(22) Filed: Jul. 14, 2021

(65) Prior Publication Data
US 2021/0342071 A1 Nov. 4, 2021

Related U.S. Application Data

(63) Continuation of application No. PCT/CN2019/083584, filed on Apr. 22, 2019.
(Continued)

(51) Int. Cl.
*G06F 3/06* (2006.01)
(52) U.S. Cl.
CPC .......... *G06F 3/0613* (2013.01); *G06F 3/0604* (2013.01); *G06F 3/064* (2013.01);
(Continued)
(58) Field of Classification Search
CPC .... G06F 3/0613; G06F 3/0604; G06F 3/0631; G06F 3/064; G06F 3/0659; G06F 3/067
See application file for complete search history.

(56) References Cited

U.S. PATENT DOCUMENTS

| 9,397,788 B1 | 7/2016 | Cai et al. |
| 2006/0165084 A1 | 7/2006 | Makhervaks et al. |
| (Continued) | | |

FOREIGN PATENT DOCUMENTS

| CN | 103248467 A | 8/2013 |
| CN | 104202391 A | 12/2014 |
| (Continued) | | |

OTHER PUBLICATIONS

"European Application No. 19912451.2, Extended European search report dated Jan. 21, 2022", (Jan. 21, 2022), 7 pgs.
(Continued)

*Primary Examiner* — Mark A Giardino, Jr.
(74) *Attorney, Agent, or Firm* — Schwegman Lundberg & Woessner, P.A.

(57) ABSTRACT

A computer-implemented method for remote direct memory access (RDMA) by a distributed storage node includes receiving a request for an input/output (I/O) process associated with data. In response to the request, a memory segment shared between the operating system and a user process is allocated using an operating system driver of the node. The user process includes an I/O stack for processing the request. The shared memory segment includes a context memory portion storing context information associated with the I/O stack, a header memory portion storing header information for the I/O process, and a data memory portion for storing the data. The shared memory segment is registered for RDMA access with a target storage node. An RDMA transfer is performed between the shared memory segment and the target node to complete the I/O process. The shared memory segment is deallocated upon completion of the RDMA transfer.

20 Claims, 14 Drawing Sheets

Related U.S. Application Data

(60) Provisional application No. 62/798,890, filed on Jan. 30, 2019.

(52) U.S. Cl.
CPC ............ G06F 3/067 (2013.01); G06F 3/0631 (2013.01); G06F 3/0659 (2013.01)

(56) References Cited

U.S. PATENT DOCUMENTS

| | | |
|---|---|---|
| 2012/0131124 A1 | 5/2012 | Frey et al. |
| 2016/0267053 A1* | 9/2016 | Sharp ...................... G06F 3/065 |
| 2017/0075856 A1 | 3/2017 | Suzue et al. |
| 2017/0149890 A1 | 5/2017 | Shamis et al. |
| 2017/0199842 A1 | 7/2017 | England et al. |
| 2018/0349313 A1 | 12/2018 | Ahn et al. |

FOREIGN PATENT DOCUMENTS

| | | |
|---|---|---|
| CN | 108268208 A | 7/2018 |
| CN | 107729159 B | 1/2021 |
| WO | WO-2020155417 A1 | 8/2020 |

OTHER PUBLICATIONS

"Chinese Application No. 201980088335.4, First Office Action dated Aug. 1, 2022", (Aug. 1, 2022), 10 pgs.

U.S. Appl. No. 62/798,890, filed Jan. 30, 2019, Input/Output Processing in a Distributed Storage Node With RDMA.

"International Application No. PCT/CN2019/083584, International Search Report and Written Opinion dated Oct. 29, 2019", (Oct. 29, 2019), 6 pgs.

* cited by examiner

INPUT/OUTPUT PROCESSING IN A DISTRIBUTED STORAGE NODE WITH RDMA

CROSS-REFERENCE TO RELATED APPLICATIONS

This application is a continuation application of International Application No. PCT/CN2019/083584, filed Apr. 22, 2019, which claims the benefit of priority to U.S. Provisional Application No. 62/798,890, filed Jan. 30, 2019, entitled "INPUT/OUTPUT PROCESSING IN A DISTRIBUTED STORAGE NODE WITH RDMA," the benefit of priority of each of which is claimed herein, and which applications and publication are hereby incorporated herein by reference in their entireties.

TECHNICAL FIELD

The present disclosure is related to storage node computing. Some aspects relate to input/output (I/O) processing in a distributed storage node. More specifically, some aspects relate to frontend I/O processing in a distributed storage node with remote direct memory access (RDMA).

BACKGROUND

In a distributed data store network architecture, distributed storage nodes can be used as an intermediary when transferring data between a client device and other storage nodes. However, for the transfer of data between the client device and destination storage node, multiple data copies are often required and performed at each intermediary device such as a distributed storage node. Additionally, the data transfer between the client device and the destination storage node may also require multiple RDMA data transfers and multiple buffer allocations.

SUMMARY

Various examples are now described to introduce a selection of concepts in a simplified form, which are further described below in the detailed description. The Summary is not intended to identify key or essential features of the claimed subject matter, nor is it intended to be used to limit the scope of the claimed subject matter.

According to a first aspect of the present disclosure, there is provided a computer-implemented method for remote direct memory access (RDMA) by a distributed storage node. The method includes receiving a request for an input/output (I/O) process associated with data. In response to the request, a memory segment shared between the operating system and a user process running on the distributed storage node is allocated using an operating system driver of the distributed storage node. The user process includes an I/O stack for processing the request. The shared memory segment includes a context memory portion storing context information associated with the I/O stack, a header memory portion storing header information for the I/O process, and a data memory portion for storing the data. The shared memory segment is registered for RDMA access with a target storage node. An RDMA transfer between the shared memory segment of the distributed storage node and the target storage node is performed to complete the I/O process. The shared memory segment is deallocated in response to receiving a status indicator of completion of the RDMA transfer.

In a first implementation form of the method according to the first aspect as such, the context information is associated with one or more of the following: a data caching operation, a data replication operation, and an RDMA transfer operation performed by the I/O stack to complete the I/O process.

In a second implementation form of the method according to the first aspect as such or any preceding implementation form of the first aspect, the context information includes context information of the operating system driver. More specifically, the context information includes callback context information indicating the user process or a function to be executed by the distributed storage node upon completion of the I/O process, and an I/O structure with active block I/O operations associated with the I/O process.

In a third implementation form of the method according to the first aspect as such or any preceding implementation form of the first aspect, the context information includes a scatter/gather (s/g) list of buffers used by the I/O stack.

In a fourth implementation form of the method according to the first aspect as such or any preceding implementation form of the first aspect, the header information comprises one or more of the following: a type of data processing operation associated with the I/O process, a logical unit number (LUN) identifying an object within the target storage node for storing or retrieving the data, a logical block address (LBA) identifying a memory offset for the RDMA transfer, length information associated with a size of the data, and a snap ID identifying a point in time or a time range for performing the RDMA transfer.

In a fifth implementation form of the method according to the first aspect as such or any preceding implementation form of the first aspect, the I/O process includes a READ operation received from a host device, and the method further includes communicating using an RDMA module within the I/O stack, the header information to the target storage node, the header information identifying the LUN and the LBA associated with the data requested by the READ operation.

In a sixth implementation form of the method according to the first aspect as such or any preceding implementation form of the first aspect, the data requested by the READ operation and the status indicator is received from the target storage node. The status indicator indicates a successful completion of the READ operation. The requested data and the status indicator are forwarded to the host device.

In a seventh implementation form of the method according to the first aspect as such or any preceding implementation form of the first aspect, the I/O process includes a WRITE operation, and the method further includes performing a direct memory access (DMA) operation by the operating system driver, to store the data in the data memory portion of the shared memory segment.

In an eighth implementation form of the method according to the first aspect as such or any preceding implementation form of the first aspect, the RDMA transfer of the header information and the data from the shared memory segment to RDMA memory within the target storage node is performed using an RDMA module within the I/O stack. The status indicator is received from the target storage node, where the status indicator indicates a successful completion of the WRITE operation.

In a ninth implementation form of the method according to the first aspect as such or any preceding implementation form of the first aspect, the operating system driver includes one or both of a Fiber Channel (FC) driver or an Internet Small Computer Systems Interface (iSCSI) Extension for RDMA (ISER) driver.

According to a second aspect of the present disclosure, there is provided a distributed storage node including a memory that stores instructions and one or more processors in communication with the memory. The one or more processors execute the instructions to receive a request for an input/output (I/O) process associated with data. In response to the request, a memory segment shared between the operating system and a user process running on the distributed storage node is allocated using an operating system driver of the distributed storage node. The user process includes an I/O stack for processing the request. The shared memory segment includes a context memory portion storing context information associated with the I/O stack, a header memory portion storing header information for the I/O process, and a data memory portion for storing the data. The shared memory segment is registered for RDMA access with a target storage node. An RDMA transfer is performed between the shared memory segment of the distributed storage node and the target storage node to complete the I/O process. The shared memory segment is deallocated in response to receiving a status indicator of completion of the RDMA transfer.

In a first implementation form of the distributed storage node according to the second aspect as such, the I/O process includes a WRITE operation, and the one or more processors execute the instructions to perform a direct memory access (DMA) operation by the operating system driver, to store the data in the data memory portion of the shared memory segment.

In a second implementation form of the distributed storage node according to the second aspect as such or any preceding implementation form of the second aspect, the RDMA transfer of the header information and the data from the shared memory segment to RDMA memory within the target storage node is performed using an RDMA module within the I/O stack. The status indicator is received from the target storage node, where the status indicator indicates a successful completion of the WRITE operation.

In a third implementation form of the distributed storage node according to the second aspect as such or any preceding implementation form of the second aspect, the header information includes one or more of the following: a type of data processing operation associated with the I/O process, a logical unit number (LUN) identifying an object within the target storage node for storing or retrieving the data, a logical block address (LBA) identifying a memory offset for the RDMA transfer, length information associated with a size of the data, and a snap ID identifying a point in time or a time range for performing the RDMA transfer.

In a fourth implementation form of the distributed storage node according to the second aspect as such or any preceding implementation form of the second aspect, the I/O process includes a READ operation received from a host device, and the one or more processors execute the instructions to communicate using an RDMA module within the I/O stack, the header information to the target storage node. The header information identifies the LUN and the LBA associated with the data requested by the READ operation.

In a fifth implementation form of the distributed storage node according to the second aspect as such or any preceding implementation form of the second aspect, the one or more processors execute the instructions to receive the data requested by the READ operation and the status indicator from the target storage node, the status indicator indicating a successful completion of the READ operation. The requested data and the status indicator are forwarded to the host device.

In a sixth implementation form of the distributed storage node according to the second aspect as such or any preceding implementation form of the second aspect, the context information includes context information of the operating system driver, such as callback context information indicating the user process or a function to be executed by the distributed storage node upon completion of the I/O process, and an I/O structure with active block I/O operations associated with the I/O process.

According to a third aspect of the present disclosure, there is provided a non-transitory computer-readable medium storing instruction for remote direct memory access (RDMA) by a distributed storage node, that when executed by one or more processors, cause the one or more processors to perform operations. The operations include receiving a request for an input/output (I/O) process associated with data. In response to the request, a memory segment shared between the operating system and a user process running on the distributed storage node is allocated using an operating system driver of the distributed storage node. The user process includes an I/O stack for processing the request. The shared memory segment includes a context memory portion storing context information associated with the I/O stack, a header memory portion storing header information for the I/O process, and a data memory portion for storing the data. The shared memory segment is registered for RDMA access with a target storage node. An RDMA transfer is performed between the shared memory segment of the distributed storage node and the target storage node to complete the I/O process. The shared memory segment is deallocated in response to receiving a status indicator of completion of the RDMA transfer.

In a first implementation form of the non-transitory computer-readable medium according to the third aspect as such, the I/O process includes a WRITE operation and upon execution, the instructions further cause the one or more processors to perform operations including performing a direct memory access (DMA) operation by the operating system driver, to store the data in the data memory portion of the shared memory segment. The RDMA transfer of the header information and the data from the shared memory segment to RDMA memory within the target storage node is performed using an RDMA module within the I/O stack. The status indicator is received from the target storage node, where the status indicator indicates a successful completion of the WRITE operation.

In a second implementation form of the non-transitory computer-readable medium according to the third aspect as such or any preceding implementation form of the third aspect, the I/O process includes a READ operation received from a host device and upon execution, the instructions further cause the one or more processors to perform operations including communicating using the RDMA module within the I/O stack, the header information to the target storage node. The header information identifies a logical unit number (LUN) and a logical block address (LBA) associated with the data requested by the READ operation. The data requested by the READ operation and the status indicator are received from the target storage node. The status indicator indicates a successful completion of the READ operation. The requested data and the status indicator are forwarded to the host device.

Any of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
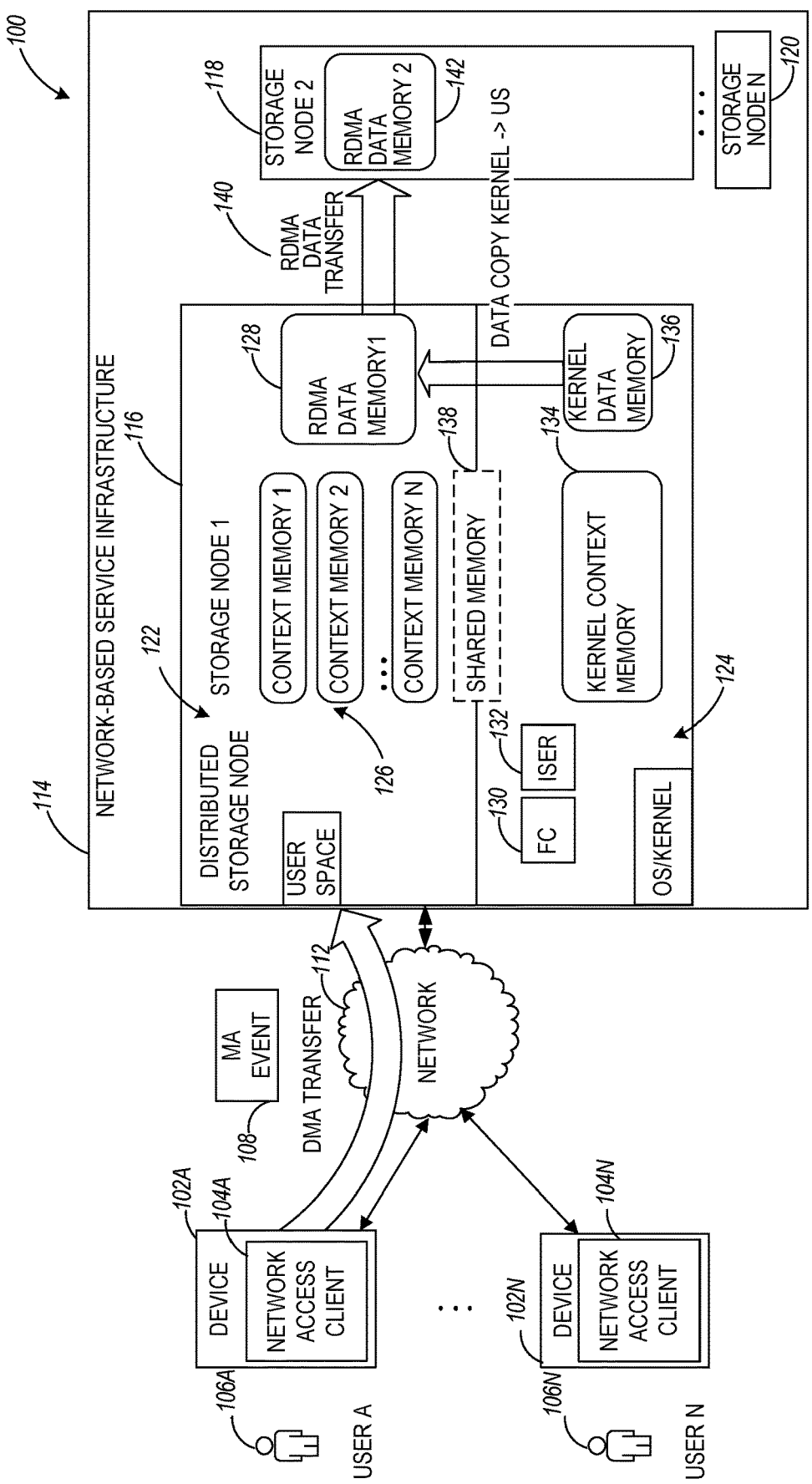
FIG. 1 is a high-level system overview of a network architecture using a distributed storage node with RDMA functionalities, according to some example embodiments.

It should be understood at the outset that although an illustrative implementation of one or more embodiments is provided below, the disclosed systems and/or methods described with respect to FIGS. 1-11 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

As used herein, the term "network-based service infrastructure" includes a plurality of network devices providing on-demand computing capacity (e.g., via one or more virtual machines or other virtual resources running on the network devices) and storage capacity as a service to a community of end-recipients (e.g., customers of the service infrastructure), where the end recipients are communicatively coupled to the network devices within the service infrastructure via a network. The customers of the service infrastructure can use one or more computing devices (also referred to as customer devices or host devices) to access and manage the services provided by the service infrastructure via the network. The customer devices, the network, and the network-based service infrastructure can be collectively referred to as a "network architecture." The customers of the service infrastructure can also be referred to as "users." As used herein, the term "memory access event" (or "MA event") can include a request for a READ operation (e.g., from memory or another type of storage) or a request for a WRITE operation (e.g., to memory or another type of storage), as well as any data associated with such operations (e.g., data for storage in connection with a requested WRITE operation). As used herein, the term "MA event" is synonymous with the term "I/O event" and "I/O process."

Conventional distributed storage systems using RDMA perform multiple memory allocations (e.g., multiple context memory allocations as data is processed by the I/O stack) as well as multiple data copies. For example, to perform the RDMA between a first storage node (i.e., an initiator) and a second storage node (i.e., a target), conventional RDMA techniques perform multiple data copies as the target data is moved between the buffer allocated by the frontend driver and the buffer that is registered for RDMA. Conventional distributed storage systems also use multiple data transfers to move the data via RDMA. For example, one data transfer might move data between a user device and a first storage node via a frontend driver such as a Fiber Channel (FC) driver, an iSCSI Extension for RDMA (ISER) driver, or non-volatile memory express (NVMe) over Fabrics (NVMe-oF) driver. A second data transfer can be via RDMA between the first storage node and the second storage node.

In this regard, distributed storage systems that transfer data through a storage node to a host device or another storage node (e.g., data is transferred from a host device to Storage Node A to Storage Node B, or vice versa), performance is reduced due to multiple data copies, multiple RDMA data transfers, and multiple buffer allocations (e.g., at the intermediary node such as Storage Node A). These attributes of the conventional techniques lead to larger overall latency and overall performance degradation.

RDMA techniques disclosed herein use a shared memory segment within a distributed storage node, where the memory segment is shared between a user space and an operating system (OS)/kernel of the node, or between different user processes running within the user space of the node, where the user processes are associated with different user process address spaces.

As used herein, the term "user space" refers to a set of programs or processes that are running outside of the OS/kernel memory address space associated with the OS/kernel of a device. Put another way, the user space includes processes that do not need access to kernel-related functions, with each process using its own user process address space. As used herein, the term "address space" refers to a range of memory addresses used by a particular process. If a process is a user process (i.e., a process that does not need access to the kernel-related functions), then it may only access memory addresses associated with its address space. Whereas, if a process is a kernel process, it may access any address of the kernel.

The shared memory segment includes a single context memory portion that can be shared by multiple processes performed by the I/O stack of the user space (e.g., a frontend module, a cache module, a replication module, and an RDMA module of an I/O stack, as described hereinbelow) as well as one or more kernel processes. The shared memory segment can also include a header memory portion for storing header information, a status memory portion for storing a status of an I/O operation, and a data memory portion for storing data (e.g., data associated with a READ or a WRITE operation). The shared memory segment is registered for RDMA access with RDMA memory at a target storage device.

By using the shared memory segment that is shared between the user space and the OS/kernel of the node, or between different user processes running within the user space of the node, optimal performance is achieved by eliminating extra data copies, achieving zero data copy operation throughout a storage node I/O stack. Additionally, by sharing a single memory allocation for context across the entire I/O lifecycle, extra memory allocations in the I/O lifecycle are not needed since a single shared allocation is used for all context memory requirements. In this regard, techniques disclosed herein can be used for simplified RDMA transactions between a distributed storage node and a remote node by using a fixed allocation of memory with known addresses (e.g., the shared memory segment), which provides for optimal performance. The allocated shared memory segment can be deallocated after confirmation of successful completion of an I/O process, which increases memory utilization efficiency.

FIG. 1 is a high-level system overview of a network architecture using a distributed storage node with RDMA functionalities, according to some example embodiments. Referring to FIG. 1, the network architecture 100 can include a plurality of devices (e.g., user devices) 102A, . . . , 102N (collectively, devices 102) communicatively coupled to a network-based service infrastructure 114 via a network 112. The devices 102A, . . . , 102N are associated with corresponding users 106A, . . . , 106N and can be configured to interact with the network-based service infrastructure 114 using a network access client, such as one of clients 104A, . . . , 104N. The network access clients 104A, . . . , 104N can be implemented as web clients or application (app) clients.

Users 106A, . . . , 106N may be referred to generically as "a user 106" or collectively as "users 106." Each user 106 may be a human user (e.g., a human being), a machine user (e.g., a computer configured by a software program to interact with the devices 102 and the network-based service infrastructure 114), or any suitable combination thereof (e.g., a human-assisted by a machine or a machine supervised by a human) The users 106 are not part of the network architecture 100 but are each associated with one or more of the devices 102 and may be users of the devices 102 (e.g., the user 106A may be an owner of the device 102A, and the user 106N may be an owner of the device 102N). For example, the device 102A may be a desktop computer, a vehicle computer, a tablet computer, a navigational device, a portable media device, or a smartphone belonging to the user 106A. Users 106A, . . . , 106N can use devices 102A, . . . , 102N to access services (e.g., serverless computing services or storage-related services) provided by the network-based service infrastructure 114. The serverless computing services can include instantiating and using virtual machines (VMs), virtual private clouds (VPCs), application containers (e.g., warm containers instantiated within a VPC), and so forth. The storage-related services can include data storage services, data replication services, and so forth.

The network-based service infrastructure 114 can include a plurality of computing devices such as storage nodes 116, 118, . . . , 120. At least one of the storage nodes, such as node 116, can be a distributed storage node functioning as an intermediary between the client devices 102 and a destination storage node, such as storage node 118, in connection with an MA event initiated by the user 106.

The distributed storage node 116 can be referred to as an initiator node or an initiator, and the destination storage node 118 can be referred to as a target node or a target. As illustrated in FIG. 1, the distributed storage node 116 can include an OS/kernel 124 that is used for executing OS-related functions and processes, and a user space 122 for executing programs and processes running outside of the OS memory address space used by the OS/kernel 124.

Any of the devices shown in FIG. 1 may be implemented in a general-purpose computer modified (e.g., configured or programmed) by software to be a special-purpose computer to perform the functions described herein for that machine, database, or device. As used herein, a "database" is a data storage resource that stores data structured as a text file, a table, a spreadsheet, a relational database (e.g., an object-relational database, a NoSQL database, a network or graph database), a triple store, a hierarchical data store, or any suitable combination thereof. Additionally, data accessed (or stored) via an application programming interface (API) or remote procedure call (RPC) may be considered to be accessed from (or stored to) a database. Moreover, any two or more of the devices or databases illustrated in FIG. 1 may be combined into a single machine, database, or device, and the functions described herein for any single machine, database, or device may be subdivided among multiple machines, databases, or devices.

Network 112 may be any network that enables the communication between or among machines, databases, and devices (e.g., devices 102A, . . . , 102N and storage nodes 116, 118, . . . , 120 within the network-based service infrastructure 114). Accordingly, network 112 may be a wired network, a wireless network (e.g., a mobile or cellular network), or any suitable combination thereof. Network 112 may include one or more portions that constitute a private network, a public network (e.g., the Internet), or any suitable combination thereof.

In some aspects, one or more of the users 106 can communicate memory access events, such as MA event 108 to the network-based service infrastructure 114 via the network 112. The MA event 108 can trigger RDMA related functionalities such as performing READ or WRITE operations via RDMA between the storage nodes within the infrastructure 114.

In aspects when the MA event 108 is for a WRITE operation, processing within the distributed storage node 116 is performed as follows. Initially, a kernel driver such as the FC driver 130 or the ISER driver 132 allocates kernel data memory 136 for storing data received from the client devices 102 and kernel context memory 134 storing context information associated with kernel functionalities. Next, the kernel driver 130 or 132 will initiate the data transfer with the client device 102 (e.g., 102A) to transfer the data from the client device into the data memory 136 allocated by the kernel driver. Subsequently, control of the I/O process of the WRITE operation is switched to the distributed storage node user space 122, which picks up the I/O and continues processing. The distributed storage node 116 will then allocate context memory 126 and RDMA-capable memory (also referred to as RDMA memory) 128 within the user space 122.

The context memory 126 is used to store the state of the I/O from the point of view of the distributed storage node, and can include multiple context memory portions (e.g., context memory 1, . . . , context memory N) that are used to store user context as data traverses from one software module to the next within the I/O stack. The RDMA memory 128 is used for copying the data from the kernel data memory 136 to the RDMA-capable memory 128. The RDMA memory 128 is a memory, which has been registered for RDMA with the computing device 102. As the I/O processing of the WRITE operation traverses the I/O stack, typically many other small context-specific allocations will occur as the I/O processing is handled by one or more processes within the user space 122.

At a final stage, an RDMA data transfer 140 occurs with the distributed storage node 116 transferring the data associated with the WRITE operation from the RDMA memory 128 to the RDMA memory 142 within the storage node (or target node) 118. In this regard, the RDMA transfer occurs with multiple phases where each phase signifies a round trip transfer of data and/or state from the initiator node (e.g., storage node 116) to the target node (e.g., storage node 118).

In some aspects, the distributed storage node 116 can use shared memory 138 in connection with RDMA-related functionalities associated with the MA event 108. Techniques disclosed herein in connection with FIG. 2-FIG. 11 are associated with using shared memory (e.g. 138) for performing RDMA-related functions. By using the shared memory 138 that is shared between the user space 122 and the OS/kernel 124 (or is shared between different user processes running within the user space 122), optimal performance is achieved by eliminating extra data copies, achieving zero data copy operation throughout a storage node I/O stack.

Figure 2:
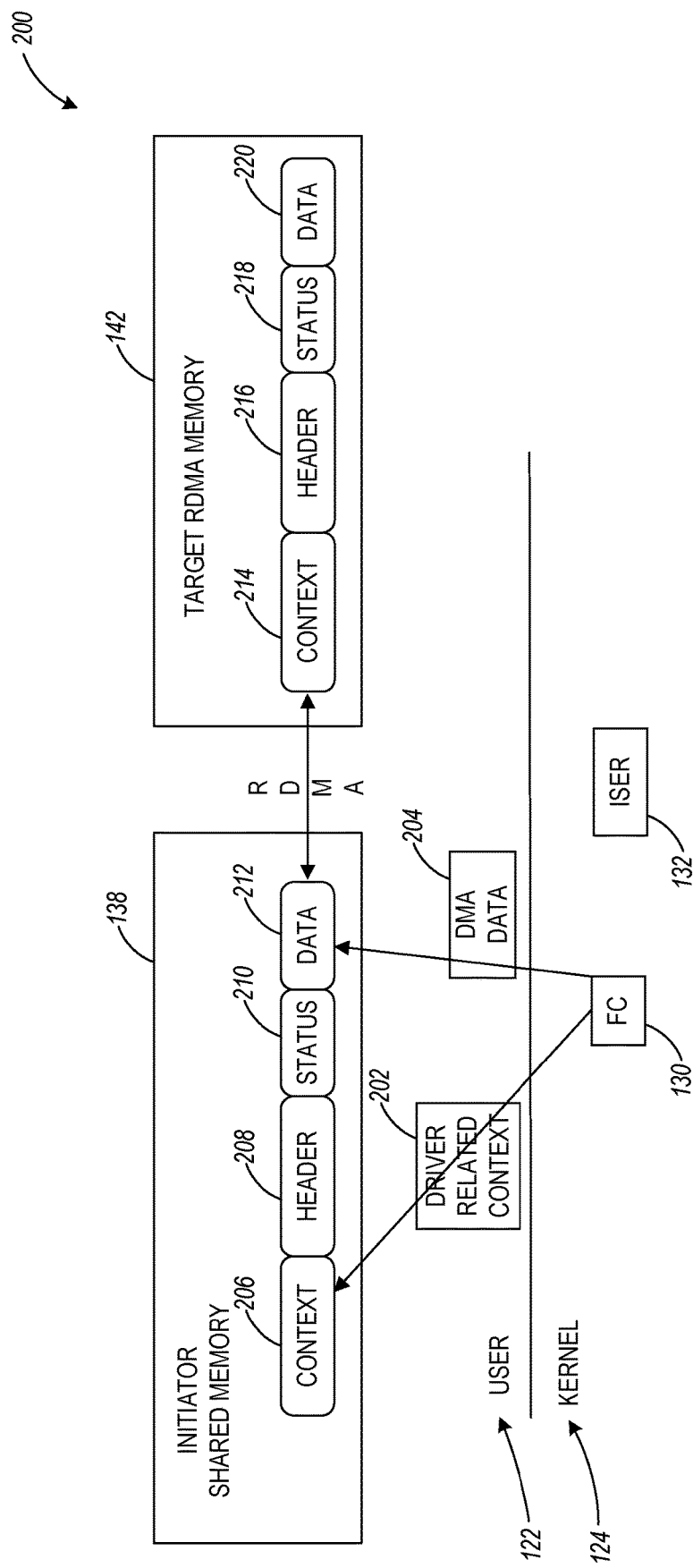
FIG. 2 is a block diagram illustrating a front-end I/O with RDMA using a shared memory segment, according to some example embodiments.

FIG. 2 is a block diagram 200 illustrating a front-end I/O with RDMA using a shared memory segment, according to some example embodiments. Referring to FIG. 2, the initiator shared memory 138 can be allocated by a kernel driver (e.g., 130 or 132) for each I/O associated with an MA event.

The initiator shared memory 138 can include a context portion 206, a header portion 208, a status portion 210, and a data portion 212.

The context portion 206 can be configured to store context information for the OS/kernel 124 (e.g., driver-related context 202) and for the user space 122 associated with a lifecycle of an I/O. Context information examples for the OS/kernel 124 can include a bio structure and callback context for user space interaction. A bio structure is a basic container for block I/O within OS/kernel 124, and it represents block I/O operations that are in flight (active) as a list of segments. A segment is a chunk of a buffer that is contiguous and memory.

Typically, when one I/O stack level hands control to another level, a callback function and a callback context are provided. The callback function includes a pointer to a function, and a callback context is a pointer to an application structure or an application object. When a callback function is invoked to return status to the originator, the callback context is provided which contains enough state to restart the I/O operation and, for example, continue the operation or complete the operation. For example, the callback context might have a pointer to memory that needs to be freed, and/or it might have another set of callback context to be called when the current I/O stack level is complete. This type of context can be used in example caching or replication operations when data traverses the I/O stack (the I/O stack is illustrated in greater detail in FIG. 9).

Example user space context information includes IoView key, scatter-gather (sg) lists, and RDMA work requests. The IoView key is a key that allows a level of the I/O stack to determine to which node or nodes to send the I/O. In this regard, the key can be perceived as a definition of where data is located for a particular logical unit number (LUN). The sg list can be used to specify the set of fixed-length buffers to be used to transfer data of dynamic size. The RDMA work request is a data structure describing an RDMA transfer to be performed.

The header portion 208 is used to store information describing the I/O, including LUN, offset information such as a logical block address (LBA), length information associated with data size, and snap ID. The snap ID is an identifier to a particular snap point in time, identifying a time range from which to fetch the data for an RDMA transfer. More specifically, the header information can indicate a type of data processing operation (e.g., a READ or a WRITE operation) associated with the I/O process. The LUN identifies an object within the target node for storing or retrieving the data)

The status portion 210 is used to store status information associated with an RDMA transfer (e.g., an RDMA READ or WRITE operation) between the initiator shared memory 138 and the target RDMA memory 142. In some aspects, the status information can include a single byte for indicating status. The data portion 212 is used to store data associated with an RDMA transfer (e.g., data communicated from a computing device for storage in the target RDMA memory 142 in connection with a WRITE operation, or data communicated from the target RDMA memory 142 to a client device via the initiator shared memory 138 during a READ operation).

The target RDMA memory 142 can include a context portion 214, a header portion 216, a status portion 218, and a data portion 220, which portions are similar in functionality to corresponding portions 206-212 of the initiator shared memory 138.

The shared memory 138 is registered for RDMA operation on both the initiator and the target side so that information (e.g., header information, status information, and data) can be exchanged via RDMA between the initiator node 116 and the target node 118. Similarly, the target RDMA memory 142 is also registered for RDMA operations on both the initiator and the target side.

By using a single allocation of the initiator shared memory 138 within the initiator node 116, extra memory allocations during the I/O lifecycle can be avoided. Additionally, local direct memory access (DMA) via the FC driver 130 or the ISER driver 132 (e.g., in connection with DMA data 204) can also use the shared memory 138, which avoids extra data copies and reduces additional memory use. In this regard, RDMA transfers include an optimal number of transfers from an optimal number of buffers (i.e., one RDMA transfer to start an RDMA operation and another transfer to complete the RDMA operation, all using the single shared memory 138).

Figure 3A:
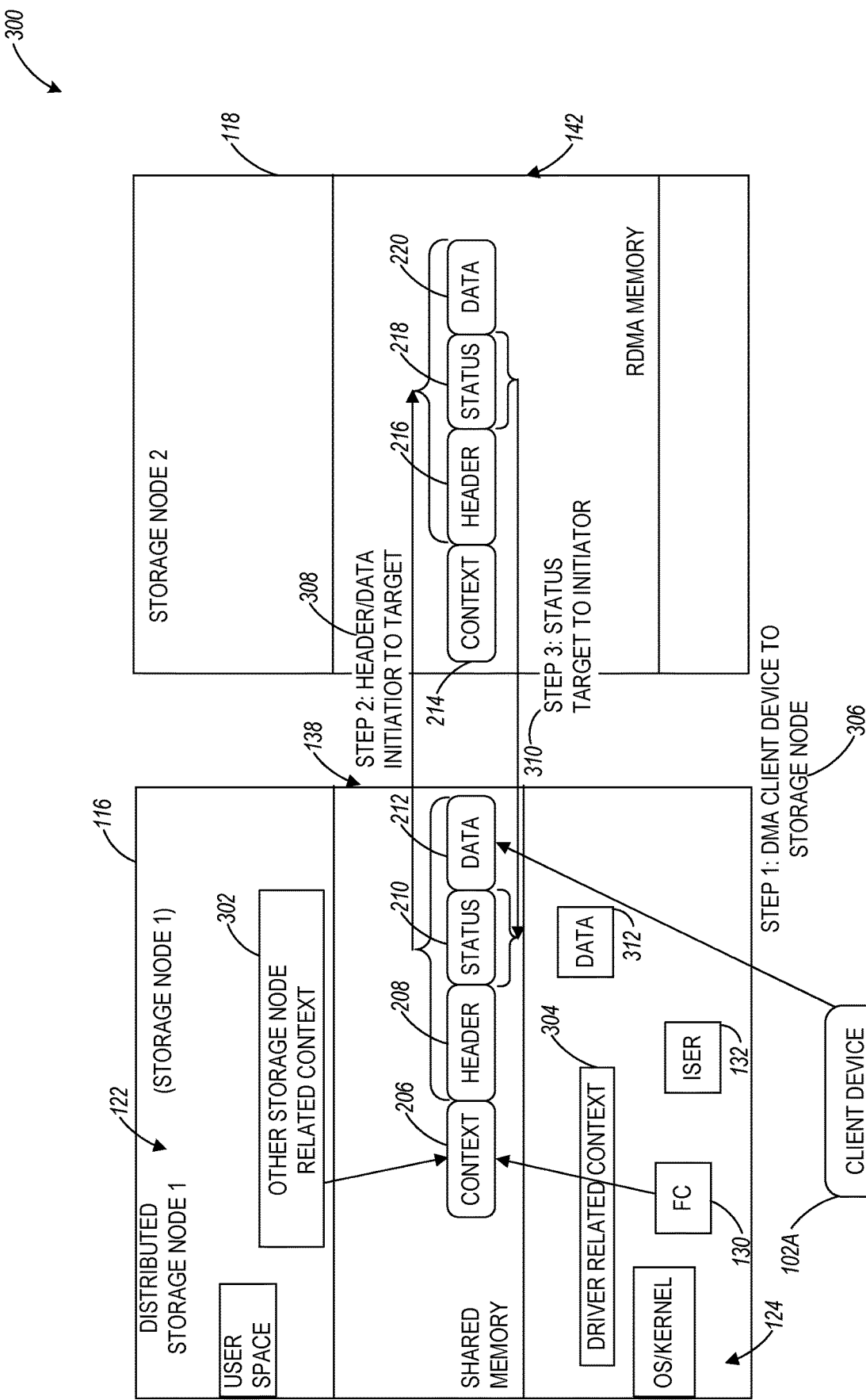
FIG. 3A is a block diagram of a storage system using a distributed storage node shared memory for performing a WRITE operation with a target storage node via RDMA, according to some example embodiments.

FIG. 3A is a block diagram of a storage system 300 using a distributed storage node shared memory for performing a WRITE operation with a target storage node via RDMA, according to some example embodiments. Referring to FIG. 3A, the shared memory 138 can be allocated by a kernel driver within the distributed storage node 116 as discussed previously. The shared memory 138 and the RDMA memory 142 are both registered for RDMA operation at storage nodes 116 and 118. As illustrated in FIG. 3A, the context portion 206 of shared memory 138 is used for storing driver-related context 304 of the OS/kernel 124 as well as storage node related context 302 generated as data is processed by different modules of the I/O stack within the user space 122.

Figure 3B:
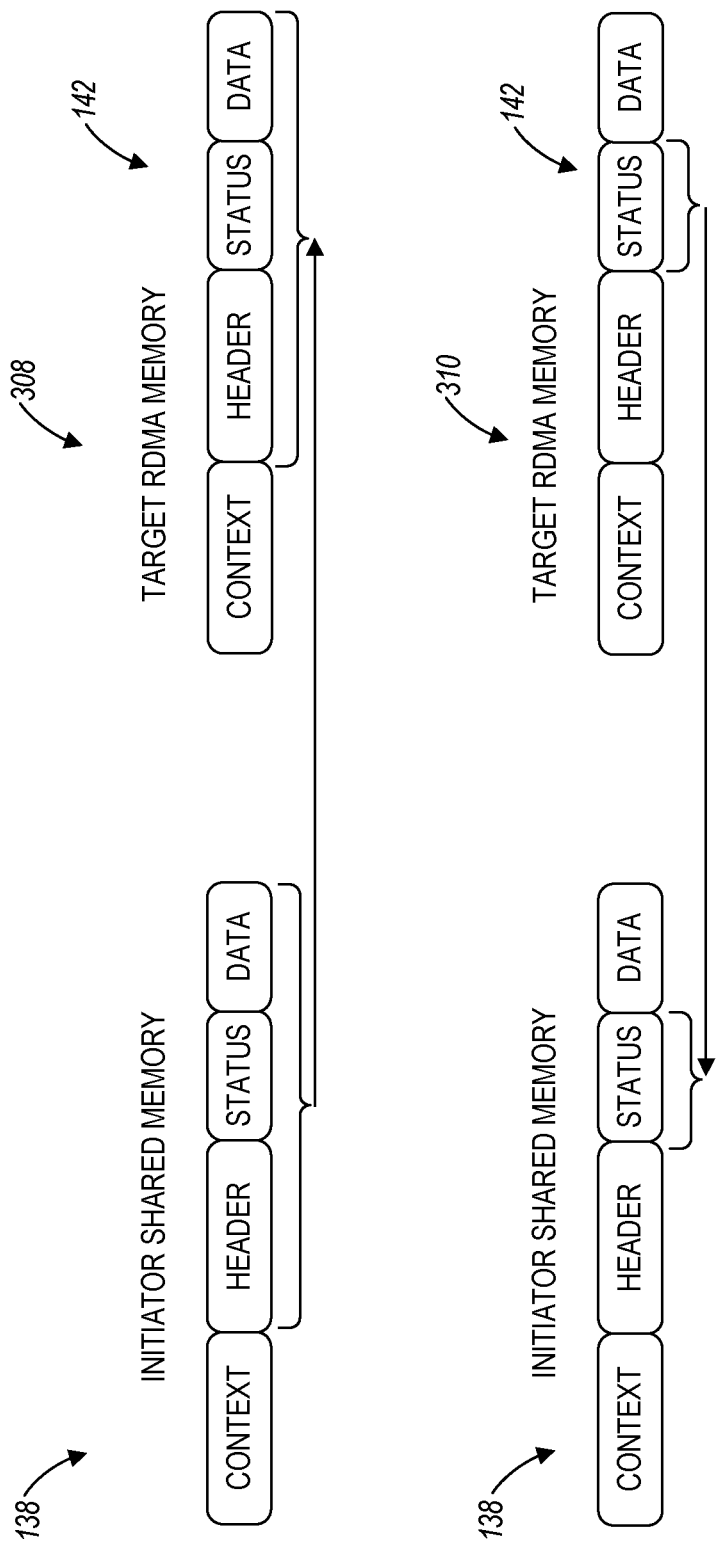
FIG. 3B is a block diagram illustrating a communication exchange between the distributed storage node shared memory and the RDMA memory of the target storage node during the WRITE operation of FIG. 3A, according to some example embodiments.
Figure 4:
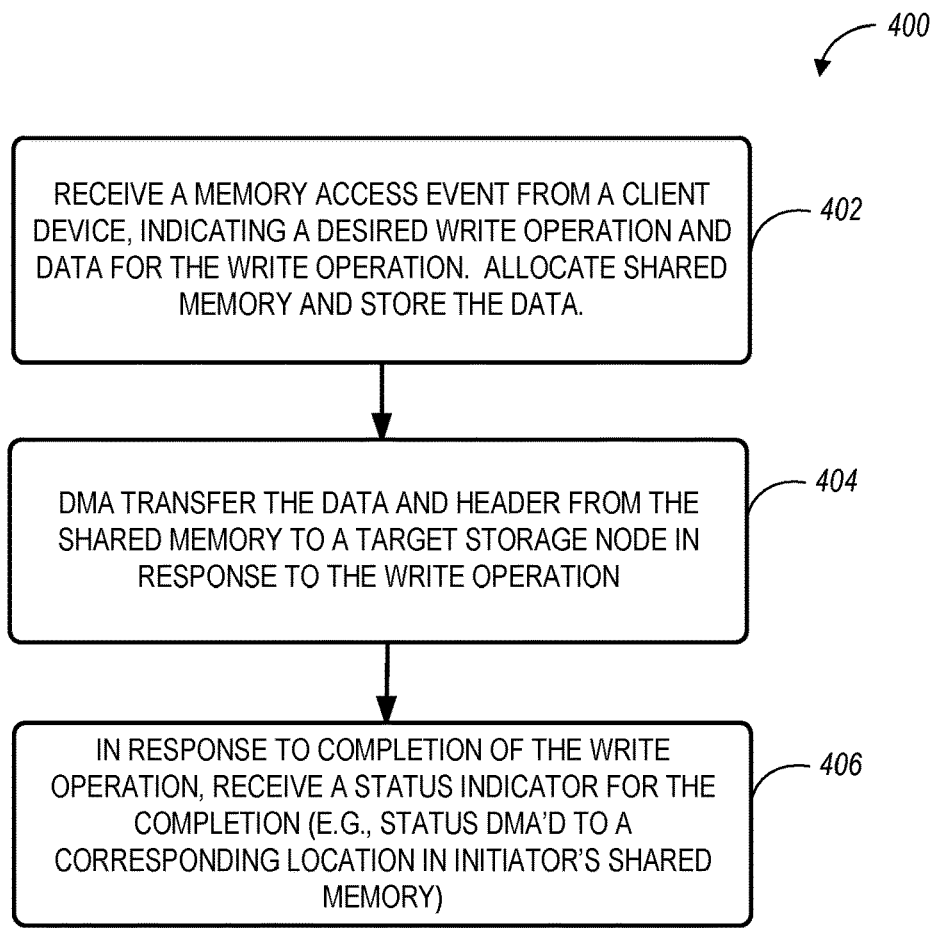
FIG. 4 is a flowchart of a method suitable for performing the WRITE operation of FIG. 3A, according to some example embodiments.

In some aspects, the MA event 108 communicated by the client device 102A can indicate a WRITE operation and can further include data 312 that is used for performing the WRITE operation. FIG. 3B and FIG. 4 provide additional information regarding usage of the shared memory 138 for performing the WRITE operation.

FIG. 3B is a block diagram illustrating a communication exchange between the distributed storage node shared memory and the RDMA memory of the target storage node during the WRITE operation of FIG. 3A, according to some example embodiments. Referring to FIG. 3A and FIG. 3B, at operation 306, direct memory access (DMA) takes place in connection with the WRITE operation of the MA event 108, and data 312 is stored within the data portion 212 of the shared memory 138. At operation 308, header information (stored in the header portion 208) associated with the WRITE operation as well as the data 312 stored in the data portion 212 of the shared memory 138 is transferred from the shared memory 138 of the initiator node 116 to the header portion 216 and the data portion 220 respectively of the RDMA memory 142 of the target node 118. The target node 118 then performs the WRITE operation using the transferred data 312 and the header information stored in the header portion 216. At operation 310, status information for the WRITE operation (e.g., indicating completion or error for the WRITE operation) is transferred via DMA from the status portion 218 of the RDMA memory 142 to the status portion 210 of the shared memory 138. In some aspects, the returned status information can include a single byte. As illustrated in FIG. 3A and FIG. 3B, a single shared memory allocation is sufficient to follow the entire I/O processing associated with WRITE operation received with the MA event 108, with zero data copies within the initiator node 116 and an optimal number of RDMA transfers (e.g., only two RDMA transfers of data are necessary for performing operations 308 and 310).

FIG. 4 is a flowchart of a method suitable for performing the WRITE operation of FIG. 3A, according to some example embodiments. Method 400 includes operations 402, 404, and 406. By way of example and not limitation, method 400 is described as being performed by the initiator node 116. At operation 402, a memory access event (e.g., MA event 108) is received at the initiator node 116 from the client device 102A. The MA event indicates a WRITE operation and also includes the data 312 associated with the WRITE operation. Shared memory 138 is allocated and the received data is stored in the data portion of the shared memory. At operation 404, header information (stored in the header portion 208) associated with the WRITE operation as well as the data 312 stored in the data portion 212 of the shared memory 138 is transferred (e.g., via DMA transfer) from the shared memory 138 of the initiator node 116 to the header portion 216 and the data portion 220 respectively of the RDMA memory 142 of the target node 118. After the WRITE operation is performed using the transferred data 312 and the header information stored in the header portion 216, at operation 406, status information for the WRITE operation (e.g., indicating completion or error for the WRITE operation) is received by the initiator node 116 via a DMA transfer from the status portion 218 of the RDMA memory 142 to the status portion 210 of the shared memory 138. Upon successful completion of the WRITE operation (e.g., as indicated by the status information), the allocated shared memory 138 can be deallocated.

Figure 5A:
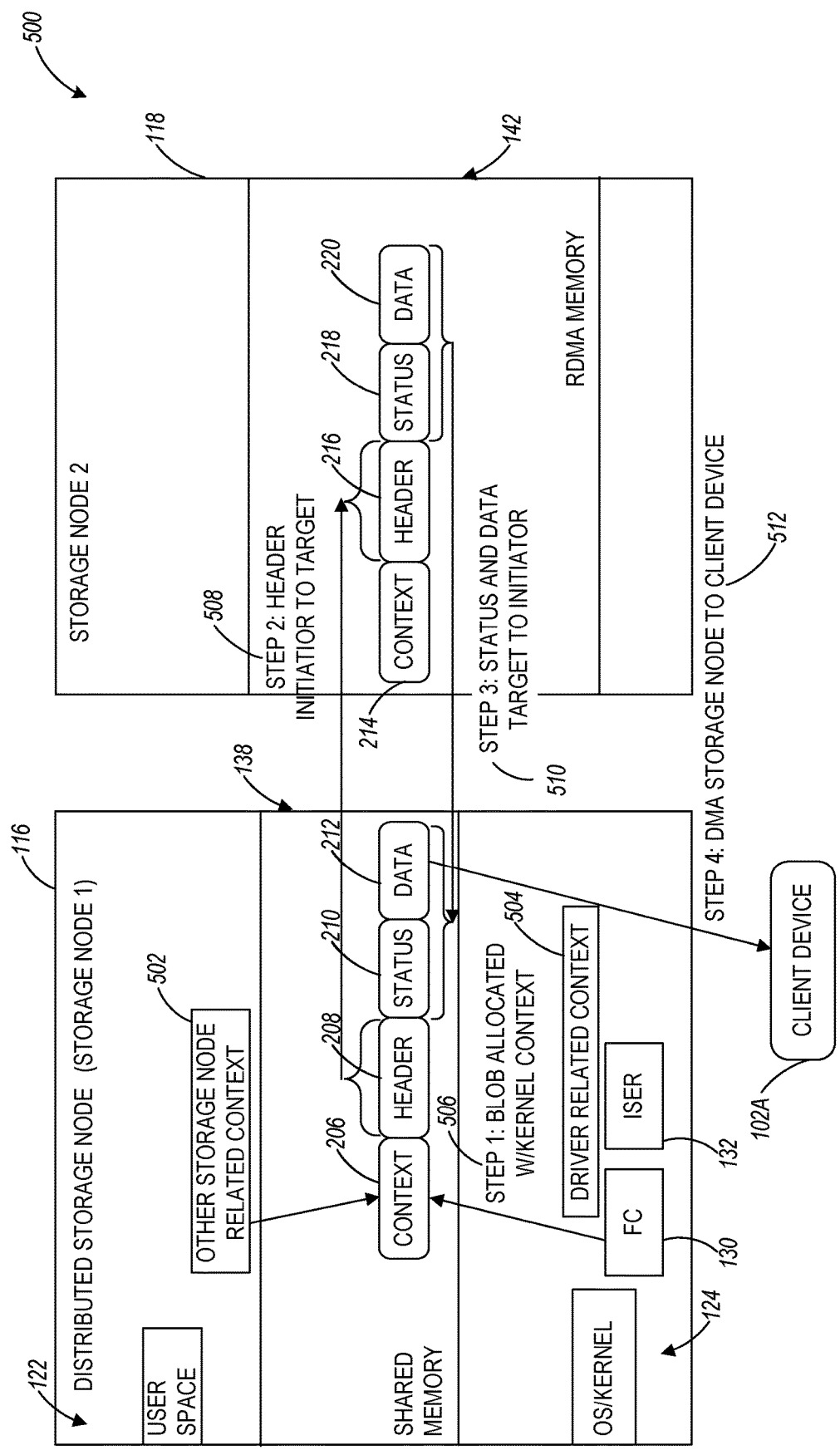
FIG. 5A is a block diagram of a storage system using a distributed storage node shared memory for performing a READ operation with a target storage node via RDMA, according to some example embodiments.

FIG. 5A is a block diagram of a storage system 500 using a distributed storage node shared memory for performing a READ operation with a target storage node via RDMA, according to some example embodiments. Referring to FIG. 5A, at operation 506, the shared memory 138 is allocated by a kernel driver within the distributed storage node 116, such as FC driver 130 or ISER driver 132 upon receiving the MA event 108 indicating a READ operation. The shared memory 138 and the RDMA memory 142 are both registered for RDMA operation at storage nodes 116 and 118. As illustrated in FIG. 5A, the context portion 206 of shared memory 138 is used for storing driver-related context 504 of the OS/kernel 124 as well as storage node related context 502 generated as data is processed by different modules of the I/O stack within the user space 122.

Figure 5B:
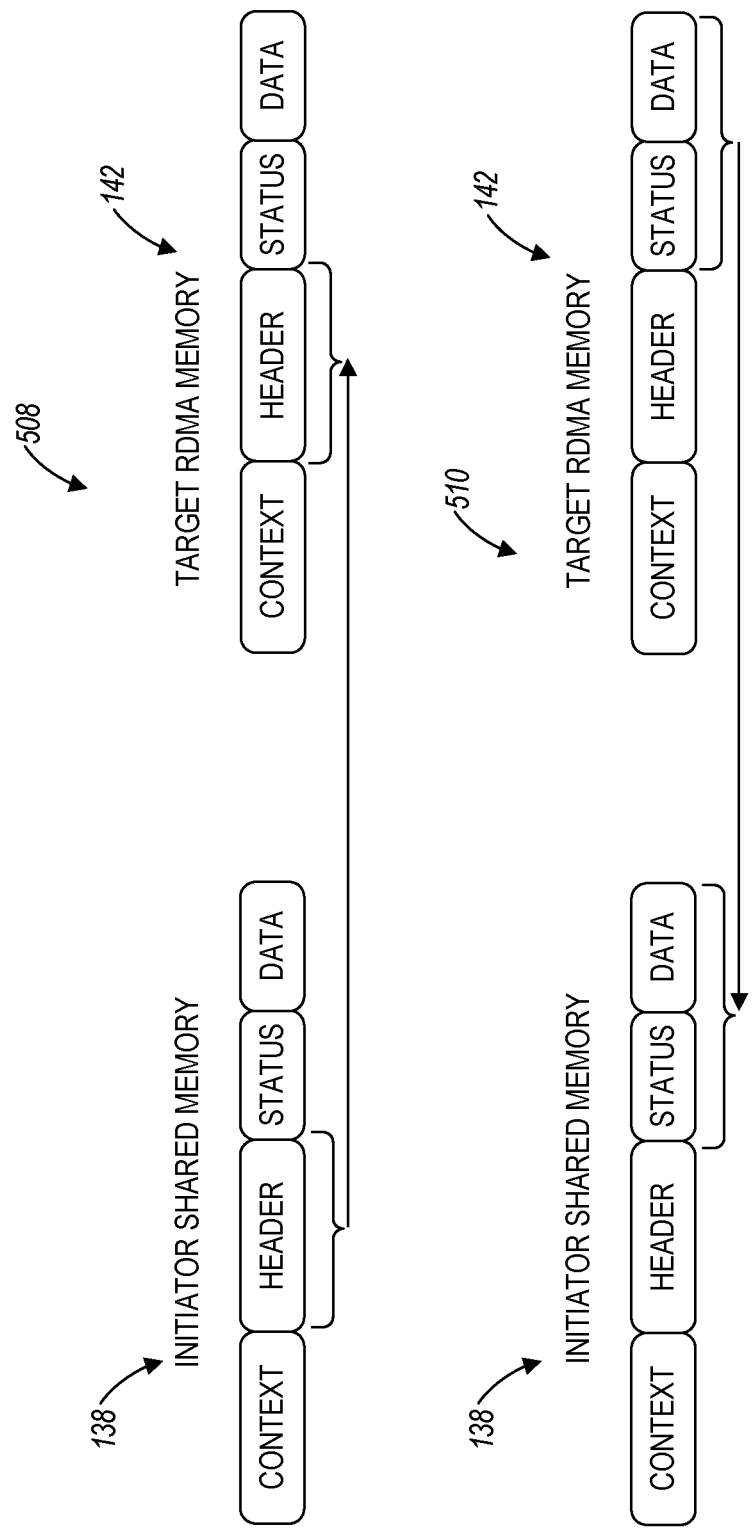
FIG. 5B is a block diagram illustrating a communication exchange between the distributed storage node shared memory and the RDMA memory of the target storage node during the READ operation of FIG. 5A, according to some example embodiments.
Figure 6:
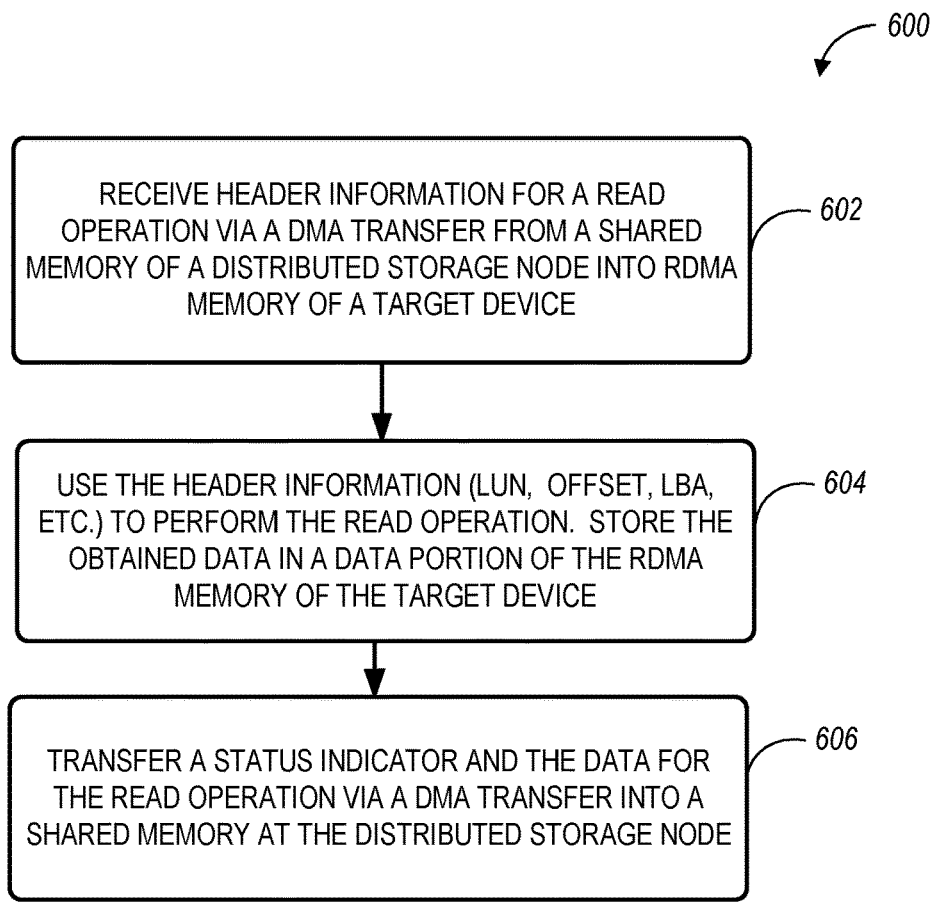
FIG. 6 is a flowchart of a method suitable for performing the READ operation of FIG. 5A, according to some example embodiments.

In some aspects, the MA event 108 communicated by the client device 102A can indicate the READ operation and can further identify the data to be obtained during the READ operation. FIG. 5B and FIG. 6 provide additional information regarding the use of the shared memory 138 for performing the READ operation.

FIG. 5B is a block diagram illustrating a communication exchange between the distributed storage node shared memory and the RDMA memory of the target storage node during the READ operation of FIG. 5A, according to some example embodiments. Referring to FIG. 5A and FIG. 5B, after the MA event 108 with the READ operation is received by the initiator node 116 and the shared memory 138 is allocated, at operation 508, a DMA takes place and header information for the READ operation is transferred from the header portion 208 of shared memory 138 to the header portion 216 of RDMA memory 142 at the target node 118. The target node 118 uses the header information (e.g., LUN, offset, LBA, and so forth) to perform the READ operation. The data obtained during the READ operation is stored in the data portion of the RDMA memory 142. At operation 510, status information from the status portion 218 (e.g., indicating successful completion of the READ) and the data from the data portion 220 of the RDMA memory 142 is transferred via a DMA transfer to the status portion 210 and the data portion 212 respectively of the shared memory 138. At operation 512, the data stored in the data portion 212 received in response to the requested READ operation is transferred via DMA transfer back to the client device 102A. In some aspects, the returned status information can include a single byte, indicating successful completion of the READ operation or an error that has occurred during the READ operation. As illustrated in FIG. 5A and FIG. 5B, a single shared memory allocation is sufficient to follow the entire I/O processing associated with the READ operation received with the MA event 108, with zero data copies within the initiator node 116 and an optimal number of RDMA transfers (e.g., only two RDMA transfers of data are necessary for performing operations 510 and 512).

FIG. 6 is a flowchart of a method suitable for performing the READ operation of FIG. 5A, according to some example embodiments. Method 600 includes operations 602, 604, and 606. By way of example and not limitation, method 600 is described as being performed by the target node 118. At operation 602, a DMA takes place and header information for the READ operation is received from the header portion 208 of shared memory 138 into the header portion 216 of the RDMA memory 142 at the target node 118. At operation 604, the target node 118 uses the header information (e.g., LUN, offset, LBA, and so forth) to perform the READ operation. The data obtained during the READ operation is stored in the data portion of the RDMA memory 142. At operation 606, status information from the status portion 218 and the data from the data portion 220 of the RDMA memory 142 is transferred via a DMA transfer to the status portion 210 and the data portion 212 respectively, of the shared memory 138. Upon successful completion of the READ operation (e.g., as indicated by the status information), the allocated shared memory 138 can be deallocated.

In aspects disclosed in connection with FIGS. 3A-6, a first set of modules resides within the OS/kernel 124 and is associated with a large, flat address space of the kernel. A second set of modules in connection with FIGS. 3A-6 is a set of modules residing within the user space 122. This set of modules resides in a user process which consists of an address space that is particular to that user process, and which address space is different from that of the kernel. In these aspects, the shared memory 138 is mapped to both address spaces.

In other aspects as illustrated and discussed in connection with FIGS. 7A-7B, two different sets of modules are illustrated that reside inside different user processes (process 0 and process 1), which have different user process address spaces (e.g., 702, 704). In these aspects, the shared memory (e.g., 706) is mapped into both address spaces used by both user processes.

Figure 7A:
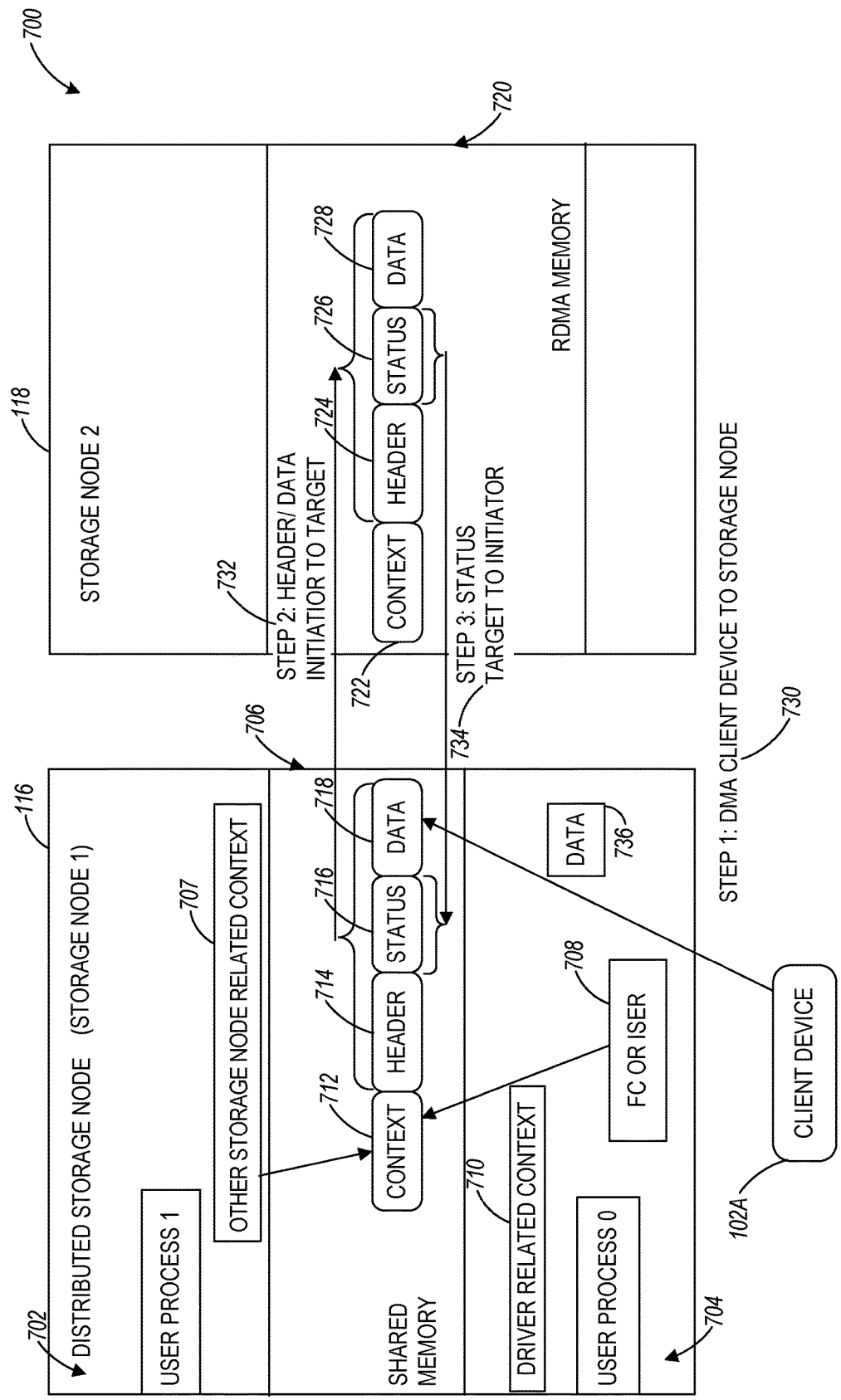
FIG. 7A is a block diagram illustrating communication exchange between a distributed storage node memory shared between two user processes and RDMA memory of a target storage node during a WRITE operation, according to some example embodiments.

FIG. 7A is a block diagram 700 illustrating communication exchange between a distributed storage node memory shared between two user processes and RDMA memory of a target storage node during a WRITE operation, according to some example embodiments. Referring to FIG. 7A, the shared memory 706 can be allocated by a driver 708 within the distributed storage node 116, with the memory 706 being shared between the two user processes (process 0 and 1) with corresponding user process address space 704 and 702. As illustrated in FIG. 7A, the driver 708 resides inside the user process address space 704 and is user space-based. The shared memory 706 and the RDMA memory 720 are both registered for RDMA operation at storage nodes 116 and 118. The memory portions 712, 714, 716, 718, 722, 724, 726, and 728 have functions that are similar to the functions of memory portions 206, 208, 210, 212, 214, 216, 218, and 220, respectively.

As illustrated in FIG. 7A, the context portion 712 of the shared memory 706 is used for storing driver-related context 710 of the user process address space 704 as well as storage node related context 707 generated as data is processed by different modules of the I/O stack within the user process address space 702. In some aspects, the MA event 108 communicated by the client device 102A can indicate a WRITE operation and can further include data 736 that is used for performing the WRITE operation.

At operation 730, direct memory access (DMA) takes place in connection with the WRITE operation of the MA event 108, and data 736 is stored within the data portion 718 of the shared memory 706. At operation 732, header information (stored in the header portion 714) associated with the WRITE operation as well as the data 736 stored in the data portion 718 of the shared memory 706 is transferred from the shared memory 706 of the initiator node 116 to the header portion 724 and the data portion 728 respectively of the RDMA memory 720 of the target node 118. The target node 118 then performs the WRITE operation using the transferred data 736 and the header information stored in the header portion 724. At operation 734, status information for the WRITE operation (e.g., indicating completion or error for the WRITE operation) is transferred via DMA from the status portion 726 of the RDMA memory 720 to the status portion 716 of the shared memory 706. Upon successful completion of the WRITE operation, the allocated shared memory 706 can be deallocated.

Figure 7B:
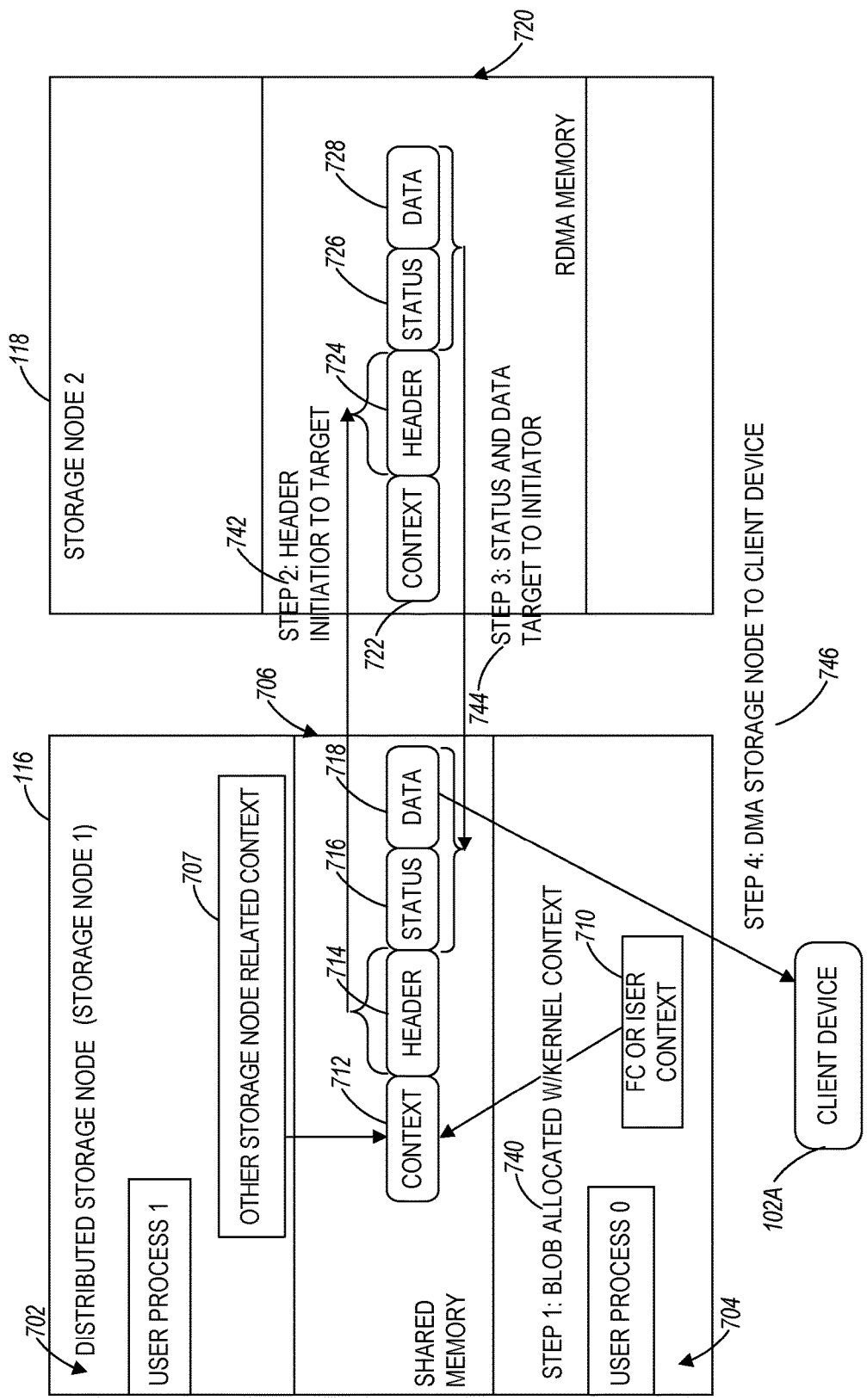
FIG. 7B is a block diagram illustrating communication exchange between a distributed storage node memory shared between two user processes and RDMA memory of a target storage node during a READ operation, according to some example embodiments.

FIG. 7B is a block diagram illustrating communication exchange between a distributed storage node memory shared between two user processes and RDMA memory of a target storage node during a READ operation, according to some example embodiments. Referring to FIG. 7B, at operation 740, the shared memory 706 is allocated by a driver within the distributed storage node 116 upon receiving the MA event 108 indicating a READ operation. As illustrated in FIG. 7B, the context portion 712 of shared memory 706 is used for storing driver-related context 710 of the device kernel as well as storage node related context 707 generated as data is processed by different modules of the I/O stack within the user space 702.

In some aspects, the MA event 108 communicated by the client device 102A can indicate the READ operation and can further identify the data to be obtained during the READ operation. After the MA event, 108 with the READ operation is received by the initiator device 116 and the shared memory 706 is allocated, at operation 742, a DMA takes place and header information for the READ operation is transferred from the header portion 714 of shared memory 706 to the header portion 724 of RDMA memory 720 at the target node 118. The target node 118 uses the header information (e.g., LUN, offset, LBA, and so forth) to perform the READ operation. The data obtained during the READ operation is stored in the data portion of the RDMA memory 720. At operation 744, status information from the status portion 726 (e.g., indicating successful completion of the READ) and the data from the data portion 728 of the RDMA memory 720 is transferred via a DMA transfer to the status portion 716 and the data portion 718 respectively of the shared memory 706. At operation 746, the data stored in the data portion 718 received in response to the requested READ operation is transferred via DMA transfer back to the client device 102A. Upon successful completion of the READ operation (e.g., as indicated by the status information and after the data is communicated to the client device 102A), the shared memory 706 can be deallocated.

Figure 8:
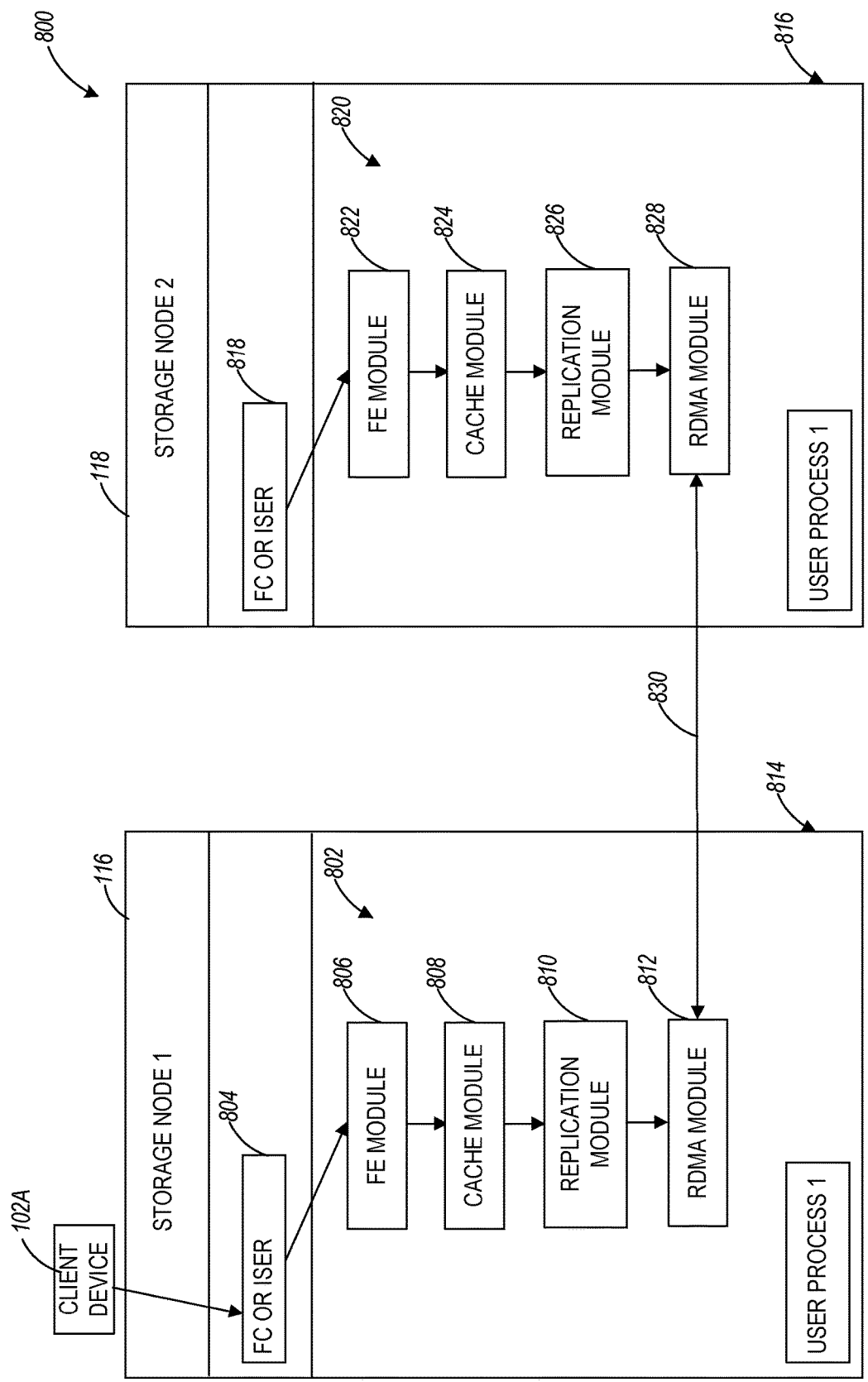
FIG. 8 is a block diagram illustrating I/O communications stacks that can be used in connection with RDMA access between storage nodes, according to some example embodiments.

FIG. 8 is a block diagram 800 illustrating I/O communications stacks that can be used in connection with RDMA access between storage nodes, according to some example embodiments. Referring to FIG. 8, storage node 116 communicates with storage node 118 via a communications link 830, which can include a wired or wireless connection. The MA event 108 is received from client device 102A by the kernel driver 804 at the storage node 116 and is passed on for processing by various modules of the I/O stack 802 of the storage node 116.

The I/O stack 802 can reside within the user address space 814 associated with a user process running on the storage node 116. The I/O stack can include a frontend (FE) module 806, a cache module 808, a replication module 810, and an RDMA module 812. The FE module 806 is configured to associate the I/O associated with MA event 108 with a LUN object and validate the range (e.g., offset and length) of the operation associated with the MA event (e.g., READ or WRITE operation).

The cache module 808 is configured to perform caching of data and, in some aspects, satisfying the operation out of the cache. For example, the cache module 808 might first check if caching is available, and then it can fulfill a read cache function by checking for the presence of the read data in the cache. If the data is available, the read operation is satisfied out of the cache. Otherwise, the cache module 808 communicates the I/O to the next module in the stack.

The replication module 810 is, in a distributed storage environment, responsible for replicating data (e.g., on WRITE operation) to remote nodes for redundancy (the redundancy is provided by the remote node instead of being stored redundantly at storage node 116).

The RDMA module 812 is configured to manage the RDMA connection to the peer nodes and manage communication operations between the local and remote nodes. For example, RDMA module 812 can manage RDMA connection to the storage node 118 via the communication link 830 to RDMA module 828.

I/O processing within storage node 118 is similar to I/O processing described above in connection with storage node 116. The kernel driver 818 can pass down a received memory access event for processing by various modules of the I/O stack 820 of the storage node 118. The I/O stack 820 resides within the user address space 816 associated with a user process running on the storage node 118. The I/O stack can include an FE module 822, a cache module 824, a replication module 826, and an RDMA module 828. The FE module 822, the cache module 824, the replication module 826, and the RDMA module 828 performs similar functions as the corresponding modules of the I/O stack 802 discussed above.

Even though aspects described herein discuss allocation of the shared memory by a kernel driver, the disclosure is not limited in this regard and another OS module (e.g., a shared memory management module such as 1060 or 1160) can be used to allocate and deallocate the shared memory (e.g., upon successful completion of a READ or WRITE operation associated with an MA event received from a client device).

Figure 9:
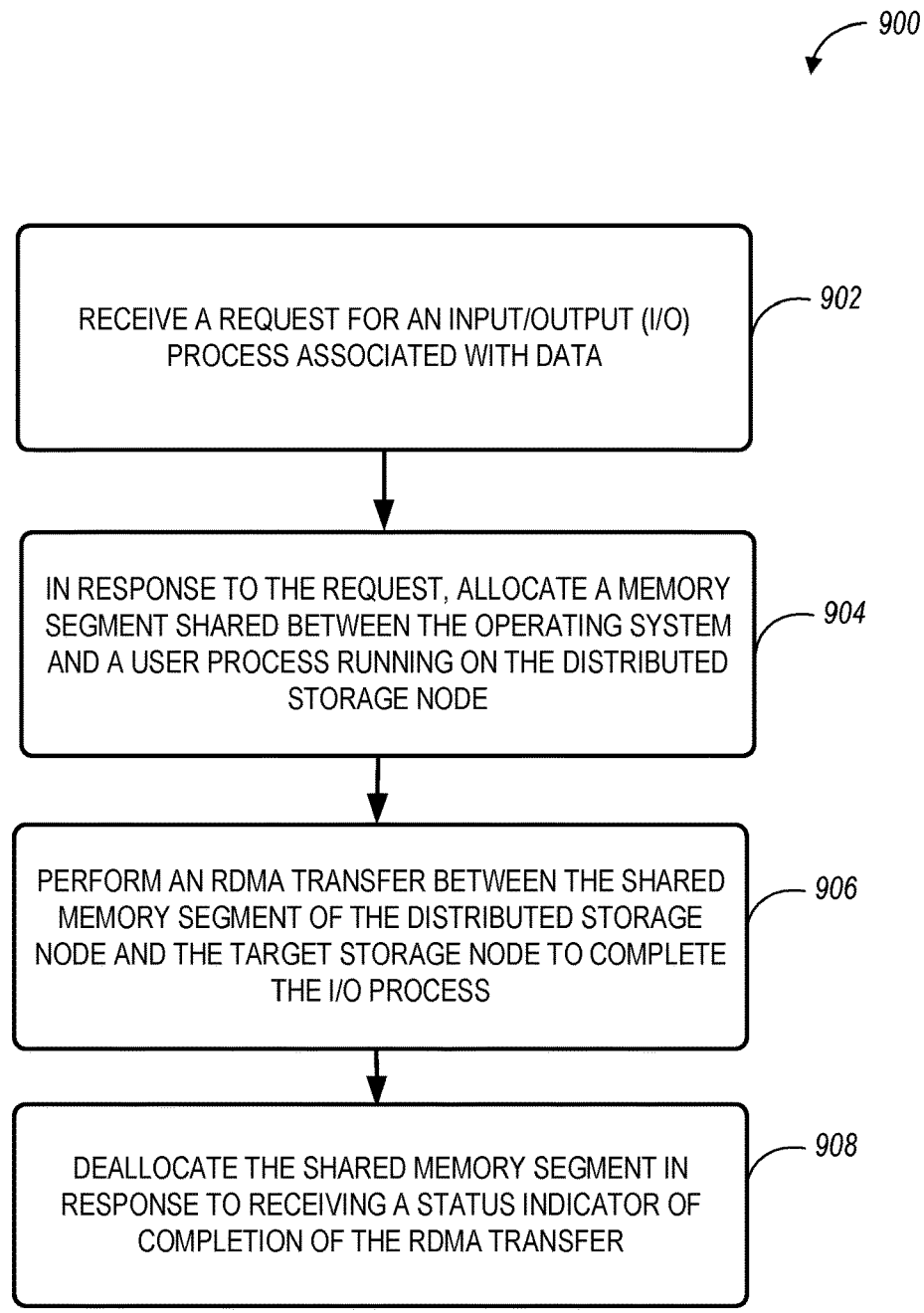
FIG. 9 is a flowchart of a method suitable for RDMA memory access by a distributed storage node, if according to some example embodiments.

FIG. 9 is a flowchart of a method suitable for RDMA memory access by a distributed storage node, if according to some example embodiments. Method 900 includes operations 902, 904, 906, and 908. By way of example and not limitation, method 900 is described as being performed by the distributed storage node 116. At operation 902, a request for an input/output (I/O) process associated with data is received. For example, the distributed storage node 116 receives an MA event 108, which includes a request for an I/O process (e.g., a READ or WRITE operation). At operation 904, in response to the request, a memory segment shared between the operating system and a user process running on the distributed storage node is allocated using an operating system driver of the distributed storage node. For example, upon receiving the MA event 108, a kernel driver (such as 130 or 132) allocates memory 138 which is shared between the address space of the kernel 124 and a user process running within the user space 122. The user process includes an I/O stack for processing the request, such as the I/O stack 802 illustrated in FIG. 8. The shared memory segment includes a context memory portion (e.g., 206) storing context information associated with the I/O stack, a header memory portion (e.g., 208) storing header information for the I/O process and a data memory portion (e.g., 212) for storing the data. Additionally, the shared memory segment is registered for RDMA access with a target storage node (e.g., as part of RDMA registration of memory at system initialization). In this regard, shared memory 138 is registered for RDMA access on the distributed storage node 116 as well as the storage node 118.

At operation 906, an RDMA transfer is performed between the shared memory segment of the distributed storage node and the target storage node to complete the I/O process. For example, during a WRITE operation, RDMA transfer of header information and data is performed from storage node 116 to storage node 118. After the WRITE operation is completed, status information is transferred via RDMA from storage node 118 to storage node 116, as illustrated in FIG. 3B. During a READ operation, RDMA transfer of header information is performed from storage node 116 to storage node 118, and RDMA transfer of data and status information is performed from storage node 118 to storage node 116 as illustrated in FIG. 5B. At operation 908, the shared memory segment is deallocated in response to receiving a status indicator of completion of the RDMA transfer.

Figure 10:
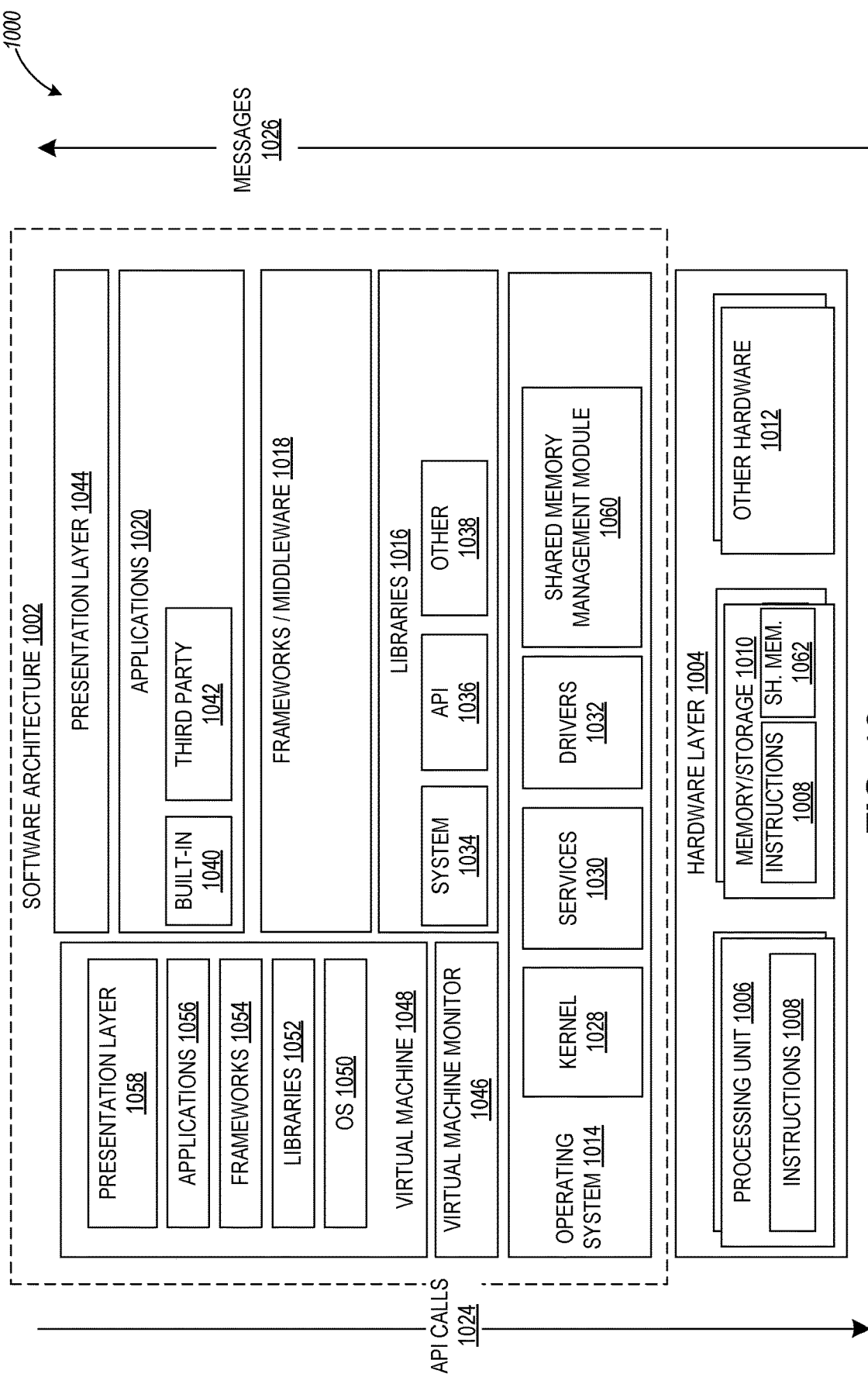
FIG. 10 is a block diagram illustrating a representative software architecture, which may be used in conjunction with various device hardware described herein, according to some example embodiments.

FIG. 10 is a block diagram illustrating a representative software architecture 1000, which may be used in conjunction with various device hardware described herein, according to some example embodiments. FIG. 10 is merely a non-limiting example of a software architecture 1002 and it will be appreciated that many other architectures may be implemented to facilitate the functionality described herein. The software architecture 1002 may be executing on hardware such as device 1100 of FIG. 11 that includes, among other things, processor 1105, memory 1110, storage 1115 and 1120, and I/O components 1125 and 1130. A representative hardware layer 1004 is illustrated and can represent, for example, the device 1100 of FIG. 11. The representative hardware layer 1004 comprises one or more processing units 1006 having associated executable instructions 1008. Executable instructions 1008 represent the executable instructions of the software architecture 1002, including implementation of the methods, modules, and so forth of FIGS. 1-9. Hardware layer 1004 also includes memory and/or storage modules 1010, which also have executable instructions 1008. Hardware layer 1004 may also comprise other hardware 1012, which represents any other hardware of the hardware layer 1004, such as the other hardware illustrated as part of device 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and presentation layer 1044. Operationally, the applications 1020 and/or other components within the layers may invoke application programming interface (API) calls 1024 through the software stack and receive a response, returned values, and so forth illustrated as messages 1026 in response to the API calls 1024. The layers illustrated in FIG. 10 are representative in nature and not all software architectures 1002 have all layers. For example, some mobile or special purpose operating systems may not provide frameworks/middleware 1018, while others may provide such a layer. Other software architectures may include additional or different layers.

The operating system 1014 may manage hardware resources and provide common services. The operating system 1014 may include, for example, a kernel 1028, services 1030, drivers 1032, and a shared memory management module 1060. The kernel 1028 may act as an abstraction layer between the hardware and the other software layers. For example, kernel 1028 may be responsible for memory management, processor management (e.g., scheduling), component management, networking, security settings, and so on. The services 1030 may provide other common services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

In some aspects, the shared memory management module 1060 may comprise suitable circuitry, logic, interfaces, and/or code and can be configured to perform one or more of the functions discussed in connection with operations 306-310 in FIG. 3A, 402-406 in FIG. 4, 506-512 in FIG. 5A, 602-606 in FIG. 6, 730-734 in FIG. 7A 740-746 in FIG. 7B, and 902-908 in FIG. 9. Additionally, the shared memory management module 1060 performs functionalities in connection with allocating shared memory 1062 used for performing I/O processing and deallocating the shared memory after completion of the I/O processing. In some aspects, functionalities of the shared memory management module 1060 can be performed by other operating system modules, such as 1028, 1030, or 1032.

Libraries 1016 may provide a common infrastructure that may be utilized by the applications 1020 and/or other components and/or layers. The libraries 1016 typically provide functionality that allows other software modules to perform tasks more easily than to interface directly with the underlying operating system 1014 functionality (e.g., kernel 1028, services 1030, drivers 1032, and/or module 1060). Libraries 1016 may include system libraries 1034 (e.g., C standard library) that may provide functions such as memory allocation functions, string manipulation functions, mathematic functions, and the like. In addition, libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. Libraries 1016 may also include a wide variety of other libraries 1038 to provide many other APIs to the applications 1020 and other software components/modules.

The frameworks/middleware 1018 (also sometimes referred to as middleware) may provide a higher-level common infrastructure that may be utilized by the applications 1020 and/or other software components/modules. For example, the frameworks/middleware 1018 may provide various graphical user interface (GUI) functions, high-level resource management, high-level location services, and so forth. The frameworks/middleware 1018 may provide a broad spectrum of other APIs that may be utilized by the applications 1020 and/or other software components/modules, some of which may be specific to a particular operating system 1014 or platform.

The applications 1020 include built-in applications 1040 and/or third-party applications 1042. Examples of representative built-in applications 1040 may include but are not limited to, a contacts application, a browser application, a book reader application, a location application, a media application, a messaging application, and/or a game application. Third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1042 may invoke the API calls 1024 provided by the mobile operating system such as operating system 1014 to facilitate functionality described herein.

The applications 1020 may utilize built-in operating system functions (e.g., kernel 1028, services 1030, drivers 1032, and/or module 1060), libraries (e.g., system libraries 1034, API libraries 1036, and other libraries 1038), and frameworks/middleware 1018 to create user interfaces to interact with users of the system. Alternatively, or additionally, in some systems, interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware machine (such as the device 1100 of FIG. 11, for example). A virtual machine 1048 is hosted by a host operating system (operating system 1014 in FIG. 10) and typically, although not always, has a virtual machine monitor 1046, which manages the operation of the virtual machine 1048 as well as the interface with the host operating system (i.e., operating system 1014). A software architecture 1002 executes within the virtual machine 1048 such as an operating system 1050, libraries 1052, frameworks/middleware 1054, applications 1056, and/or presentation layer 1058. These layers of software architecture executing within the virtual machine 1048 can be the same as corresponding layers previously described or may be different.

Figure 11:
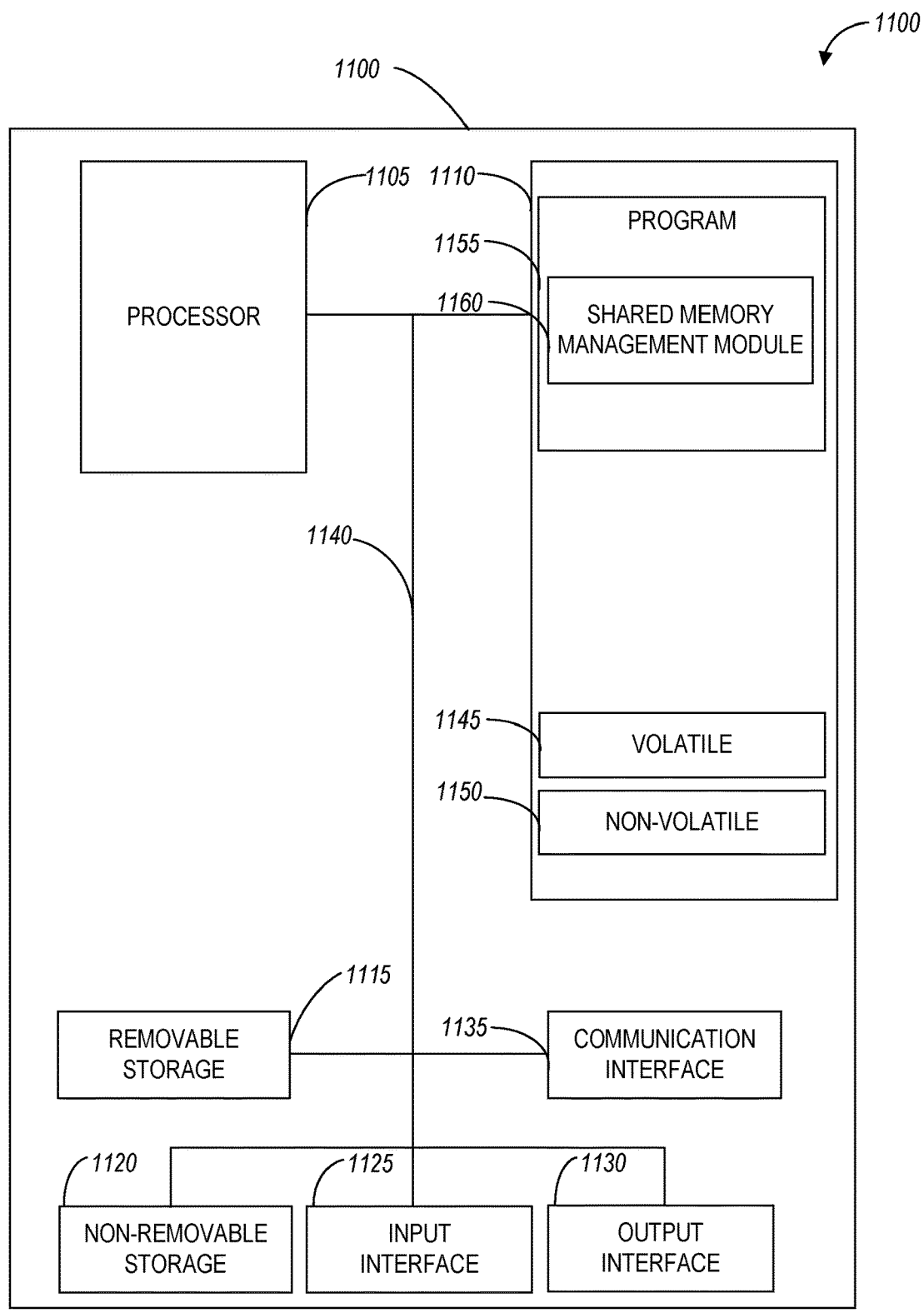
FIG. 11 is a block diagram illustrating circuitry for a device that implements algorithms and performs methods, according to some example embodiments.

FIG. 11 is a block diagram illustrating circuitry for a device that implements algorithms and performs methods, according to some example embodiments. All components need not be used in various embodiments. For example, clients, servers, and cloud-based network devices may each use a different set of components, or in the case of servers, larger storage devices.

One example computing device in the form of a computer 1100 (also referred to as computing device 1100, computer system 1100, or computer 1100) may include a processor 1105, memory 1110, removable storage 1115, non-removable storage 1120, an input interface 1125, an output interface 1130, and communication interface 1135, all connected by a bus 1140. Although the example computing device is illustrated and described as the computer 1100, the computing device may be in different forms in different embodiments.

The memory 1110 may include volatile memory 1145 and non-volatile memory 1150 and may store a program 1155. The computer 1100 may include—or have access to a computing environment that includes—a variety of computer-readable media, such as the volatile memory 1145, the non-volatile memory 1150, the removable storage 1115, and the non-removable storage 1120. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 1155 stored in the memory 1110) are executable by the processor 1105 of the computer 1100. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example. As used herein, the terms "computer-readable medium" and "machine-readable medium" are interchangeable.

Program 1155 may utilize a customer preference structure using modules discussed herein, such as a shared memory management module 1160. The shared memory management module 1160 may be the same as the shared memory management module 1060 as discussed in connection with FIG. 10.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some aspects, the shared memory management module 1160, as well as one or more other modules that are part of the program 1155, can be integrated as a single module, performing the corresponding functions of the integrated modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above concerning any one or all of the steps of the disclosure can be installed in and sold with one or more computing devices consistent with the disclosure. Alternatively, the software can be obtained and loaded into one or more computing devices, including obtaining the software through a physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components outlined in the description or illustrated in the drawings. The embodiments herein are capable of other embodiments and capable of being practiced or carried out in various ways. Also, it will be understood that the phraseology and terminology used herein are for description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled", and variations thereof, are not restricted to physical or mechanical connections or couplings. Further, terms such as up, down, bottom, and top are relative, and are employed to aid illustration, but are not limiting.

The components of the illustrative devices, systems, and methods employed in accordance with the illustrated embodiments can be implemented, at least in part, in digital electronic circuitry, analog electronic circuitry, or computer hardware, firmware, software, or in combinations of them. These components can be implemented, for example, as a computer program product such as a computer program, program code or computer instructions tangibly embodied in an information carrier, or a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other units suitable for use in a computing environment. A computer program can be deployed to be executed on one computer or multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code, or instructions to perform functions (e.g., by operating on input data and/or generating an output). Method steps can also be performed by, and apparatus for performing the methods can be implemented as, special purpose logic circuitry, e.g., an FPGA (field-programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, an FPGA or other programmable logic device, discrete gate, or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" (or "computer-readable medium") means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium or a combination of multiple media, that is capable of storing instructions for execution by one or more processors 1105, such that the instructions, when executed by one or more processors 1105, cause the one or more processors 1105 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Although the present disclosure has been described with reference to specific features and embodiments thereof, it is evident that various modifications and combinations can be made thereto without departing from the scope of the disclosure. For example, other components may be added to, or removed from, the described systems. The specification and drawings are, accordingly, to be regarded simply as an illustration of the disclosure as defined by the appended claims, and are contemplated to cover any modifications, variations, combinations, or equivalents that fall within the scope of the present disclosure. Other aspects may be within the scope of the following claims.

What is claimed is:

1. A computer-implemented method for remote direct memory access (RDMA) by a distributed storage node, the method comprising:
   receiving a request for an input/output (I/O) process associated with data;
   in response to the request, allocating using an operating system driver of the distributed storage node, a memory segment shared between the operating system and a user process running on the distributed storage node, wherein:
     the user process includes an I/O stack for processing the request;
     the shared memory segment includes a context memory portion storing context information associated with the I/O stack, a header memory portion storing header information for the I/O process, and a data memory portion for storing the data; and
     the shared memory segment is registered for RDMA access with a target storage node;
   performing an RDMA transfer between the shared memory segment of the distributed storage node and the target storage node to complete the I/O process; and
   deallocating the shared memory segment in response to receiving a status indicator of completion of the RDMA transfer.

2. The computer-implemented method of claim 1, wherein the context information is associated with one or more of the following: a data caching operation, a data replication operation, and an RDMA transfer operation performed by the I/O stack to complete the I/O process.

3. The computer-implemented method of claim 2, wherein the context information comprises context information of the operating system driver, including:
   callback context information indicating the user process or a function to be executed by the distributed storage node upon completion of the I/O process; and
   an I/O structure with active block I/O operations associated with the I/O process.

4. The computer-implemented method of claim 2, wherein the context information comprises a scatter/gather (s/g) list of buffers used by the I/O stack.

5. The computer-implemented method of claim 1, wherein the header information comprises one or more of the following:
   a type of data processing operation associated with the I/O process;
   a logical unit number (LUN) identifying an object within the target storage node for storing or retrieving the data;
   a logical block address (LBA) identifying a memory offset for the RDMA transfer;
   length information associated with a size of the data; and
   a snap ID identifying a point in time or a time range for performing the RDMA transfer.

6. The computer-implemented method of claim 5, wherein the I/O process comprises a READ operation received from a host device, and the method further comprises:
   communicating using an RDMA module within the I/O stack, the header information to the target storage node, the header information identifying the LUN and the LBA associated with the data requested by the READ operation.

7. The computer-implemented method of claim 6, further comprising:
   receiving the data requested by the READ operation and the status indicator from the target storage node, the status indicator indicating a successful completion of the READ operation; and
   forwarding the data requested by the READ operation and the status indicator to the host device.

8. The computer-implemented method of claim 1, wherein the I/O process comprises a WRITE operation, and the method further comprises:
   performing a direct memory access (DMA) operation by the operating system driver, to store the data in the data memory portion of the shared memory segment.

9. The computer-implemented method of claim 8, further comprising:
   performing using an RDMA module within the I/O stack, the RDMA transfer of the header information and the data from the shared memory segment to RDMA memory within the target storage node; and
   receiving the status indicator from the target storage node, wherein the status indicator indicates a successful completion of the WRITE operation.

10. The computer-implemented method of claim 1, wherein the operating system driver includes one or both of a Fiber Channel (FC) driver or an Internet Small Computer Systems Interface (iSCSI) Extension for RDMA (ISER) driver.

11. A distributed storage node, comprising:
a memory that stores instructions; and
one or more processors in communication with the memory, wherein the one or more processors execute the instructions to:
   receive a request for an input/output (I/O) process associated with data;
   in response to the request, allocate using an operating system driver of the distributed storage node, a memory segment shared between the operating system and a user process running on the distributed storage node, wherein:
      the user process includes an I/O stack for processing the request;
      the shared memory segment includes a context memory portion storing context information associated with the I/O stack, a header memory portion storing header information for the I/O process, and a data memory portion for storing the data; and
      the shared memory segment is registered for RDMA access with a target storage node;
   perform an RDMA transfer between the shared memory segment of the distributed storage node and the target storage node to complete the I/O process; and
   deallocate the shared memory segment in response to receiving a status indicator of completion of the RDMA transfer.

12. The distributed storage node of claim 11, wherein the I/O process comprises a WRITE operation, and the one or more processors execute the instructions to:
   perform a direct memory access (DMA) operation by the operating system driver, to store the data in the data memory portion of the shared memory segment.

13. The distributed storage node of claim 12, wherein the one or more processors execute the instructions to:
   perform using an RDMA module within the I/O stack, the RDMA transfer of the header information and the data from the shared memory segment to RDMA memory within the target storage node; and
   receive the status indicator from the target storage node, wherein the status indicator indicates a successful completion of the WRITE operation.

14. The distributed storage node of claim 11, wherein the header information comprises one or more of the following:
   a type of data processing operation associated with the I/O process;
   a logical unit number (LUN) identifying an object within the target storage node for storing or retrieving the data;
   a logical block address (LBA) identifying a memory offset for the RDMA transfer;
   length information associated with a size of the data; and
   a snap ID identifying a point in time or a time range for performing the RDMA transfer.

15. The distributed storage node of claim 14, wherein the I/O process comprises a READ operation received from a host device, and the one or more processors execute the instructions to:
   communicate using an RDMA module within the I/O stack, the header information to the target storage node, the header information identifying the LUN and the LBA associated with the data requested by the READ operation.

16. The distributed storage node of claim 15, wherein the one or more processors execute the instructions to:

receive the data requested by the READ operation and the status indicator from the target storage node, the status indicator indicating a successful completion of the READ operation; and forward the data requested by the READ operation and the status indicator to the host device.

17. The distributed storage node of claim 11, wherein the context information comprises context information of the operating system driver, including:

callback context information indicating the user process or a function to be executed by the distributed storage node upon completion of the I/O process; and an I/O structure with active block I/O operations associated with the I/O process.

18. A non-transitory computer-readable medium storing computer instructions for remote direct memory access (RDMA) by a distributed storage node, wherein the instructions when executed by one or more processors, cause the one or more processors to perform steps of:

receiving a request for an input/output (I/O) process associated with data;

in response to the request, allocating using an operating system driver of the distributed storage node, a memory segment shared between the operating system and a user process running on the distributed storage node, wherein:

the user process includes an I/O stack for processing the request;

the shared memory segment includes a context memory portion storing context information associated with the I/O stack, a header memory portion storing header information for the I/O process, and a data memory portion for storing the data; and the shared memory segment is registered for RDMA access with a target storage node;

performing an RDMA transfer between the shared memory segment of the distributed storage node and the target storage node to complete the I/O process; and deallocating the shared memory segment in response to receiving a status indicator of completion of the RDMA transfer.

19. The non-transitory computer-readable medium of claim 18, wherein the I/O process comprises a WRITE operation, and the instructions further cause the one or more processors to perform steps of:

performing a direct memory access (DMA) operation by the operating system driver, to store the data in the data memory portion of the shared memory segment;

performing using an RDMA module within the I/O stack, the RDMA transfer of the header information and the data from the shared memory segment to RDMA memory within the target storage node; and receiving the status indicator from the target storage node, wherein the status indicator indicates a successful completion of the WRITE operation.

20. The non-transitory computer-readable medium of claim 19, wherein the I/O process comprises a READ operation received from a host device, and the instructions further cause the one or more processors to perform steps of:

communicating using the RDMA module within the I/O stack, the header information to the target storage node, the header information identifying a logical unit number (LUN) and a logical block address (LBA) associated with the data requested by the READ operation;

receiving the data requested by the READ operation and the status indicator from the target storage node, the status indicator indicating a successful completion of the READ operation; and forwarding the data requested by the READ operation and the status indicator to the host device.

* * * * *